(12) United States Patent
Ham

(10) Patent No.: US 12,293,022 B2
(45) Date of Patent: *May 6, 2025

(54) DISPLAY APPARATUS

(71) Applicant: LG Display Co., Ltd., Seoul (KR)

(72) Inventor: Yong-Su Ham, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/357,939

(22) Filed: Jul. 24, 2023

(65) Prior Publication Data

US 2024/0019936 A1  Jan. 18, 2024

Related U.S. Application Data

(63) Continuation of application No. 17/108,597, filed on Dec. 1, 2020, now Pat. No. 11,747,905.

(30) Foreign Application Priority Data

Dec. 9, 2019 (KR) .................. 10-2019-0163044

(51) Int. Cl.
*G06F 3/01* (2006.01)
*G06F 3/041* (2006.01)
*H04R 1/02* (2006.01)
*H04R 17/00* (2006.01)

(52) U.S. Cl.
CPC .............. *G06F 3/016* (2013.01); *H04R 1/028* (2013.01); *H04R 17/00* (2013.01); *G06F 3/041* (2013.01); *H04R 2400/03* (2013.01); *H04R 2499/15* (2013.01)

(58) Field of Classification Search
CPC ......... G06F 3/016; G06F 3/041; H04R 1/028; H04R 17/00; H04R 2400/03; H04R 2499/15

USPC ......................................................... 381/333
See application file for complete search history.

(56) References Cited

U.S. PATENT DOCUMENTS

| 9,730,330 | B1 | 8/2017 | Boyle et al. |
| 2008/0312537 | A1 | 12/2008 | Hyuga |
| 2009/0167704 | A1 | 7/2009 | Terlizzi et al. |
| 2009/0231959 | A1 | 9/2009 | Korbler et al. |
| 2011/0043454 | A1 | 2/2011 | Modarres et al. |
| 2016/0088399 | A1 | 3/2016 | Watanabe |
| 2017/0045915 | A1 | 2/2017 | Pope et al. |

(Continued)

FOREIGN PATENT DOCUMENTS

| CN | 101918151 A | 12/2010 |
| CN | 102576250 A | 7/2012 |

(Continued)

OTHER PUBLICATIONS

Office Action issued in corresponding Korean Patent Application No. 10-2019-0163044, dated Apr. 23, 2024.

(Continued)

*Primary Examiner* — Sean H Nguyen
(74) *Attorney, Agent, or Firm* — Morgan, Lewis & Bockius LLP

(57) ABSTRACT

A display apparatus includes a display panel configured to display an image and a vibration generating device configured to vibrate the display panel. The vibration generating device includes a plurality of first portions having a piezoelectric characteristic, and a plurality of second portions disposed between the plurality of first portions to have flexibility.

43 Claims, 25 Drawing Sheets

(56) References Cited

U.S. PATENT DOCUMENTS

| | | |
|---|---|---|
| 2017/0280217 A1 | 9/2017 | Choi et al. |
| 2018/0328799 A1 | 11/2018 | Park et al. |
| 2019/0149908 A1 | 5/2019 | Kim et al. |
| 2019/0208299 A1 | 7/2019 | Kim et al. |
| 2020/0059733 A1 | 2/2020 | Shin et al. |

FOREIGN PATENT DOCUMENTS

| | | |
|---|---|---|
| CN | 108463701 A | 8/2018 |
| CN | 110854262 A | 2/2020 |
| JP | 2008-311700 A | 12/2008 |
| KR | 10-2010-0098525 A | 9/2010 |
| KR | 10-2018-0078121 A | 7/2018 |
| KR | 10-2019-0064996 A | 6/2019 |
| KR | 10-2019-0081969 A | 7/2019 |

OTHER PUBLICATIONS

Office Action issued in corresponding Chinese Patent Application No. 202011381960.9, dated Jun. 17, 2024.

(a)

(b)

(a)

(b)

DISPLAY APPARATUS

CROSS-REFERENCE TO RELATED APPLICATIONS

This application is a continuation of application Ser. No. 17/108,597, filed on Dec. 1, 2020, which claims the benefit of and priority to the Korean Patent Application No. 10-2019-0163044 filed on Dec. 9, 2019, the entirety of each of which is incorporated herein by reference, as if fully set forth herein, for all purposes.

BACKGROUND

Technical Field

The present disclosure relates to a display apparatus.

Discussion of the Related Art

In display apparatuses, a display panel displays an image, and a separate speaker should be installed for providing a sound generally. When a speaker is disposed in a display apparatus, the speaker occupies a space, and due to this, the design and spatial disposition of the display apparatus are limited.

A speaker applied to display apparatuses may be, for example, an actuator including a magnet and a coil. However, when the actuator is applied to the display apparatuses, a thickness thereof is thick. Piezoelectric elements which enable thinness to be implemented are attracting much attention.

Because the piezoelectric elements have a fragile characteristic, the piezoelectric elements are easily damaged by an external impact, and due to this, the reliability of sound reproduction is low. Also, since heat occurs due to a vibration of a piezoelectric element, the image quality of a display panel is adversely affected by the heat.

SUMMARY

Accordingly, embodiments of the present disclosure are directed to a display apparatus that substantially obviates one or more problems due to limitations and disadvantages of the related art.

Therefore, the inventor has recognized problems described above and have performed various experiments for enhancing the quality of a sound and decreasing the occurrence of heat. Through the various experiments, the inventor has invented a display apparatus having a new structure for enhancing the quality of a sound and decreasing the occurrence of heat.

An aspect of the present disclosure is to provide a display apparatus including a vibration generating device which is disposed on a rear surface of a display panel and vibrates the display panel to generate a sound or a vibration, thereby enhancing a vibration characteristic.

Another aspect of the present disclosure is to provide a display apparatus including a vibration generating device for decreasing the occurrence of heat.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and claims hereof as well as the appended drawings.

To achieve these and other inventive concepts, as embodied and broadly described herein, a display apparatus comprises a display panel configured to display an image and a vibration generating device configured to vibrate the display panel, wherein the vibration generating device includes a plurality of first portions having a piezoelectric characteristic, and a plurality of second portions disposed between the plurality of first portions to have flexibility.

In another aspect, a display apparatus comprises a display panel configured to display an image and a vibration generating device configured to vibrate the display panel, wherein the vibration generating device includes a piezoelectric composite layer including a plurality of first portions and a plurality of second portions.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION

Figure 1:
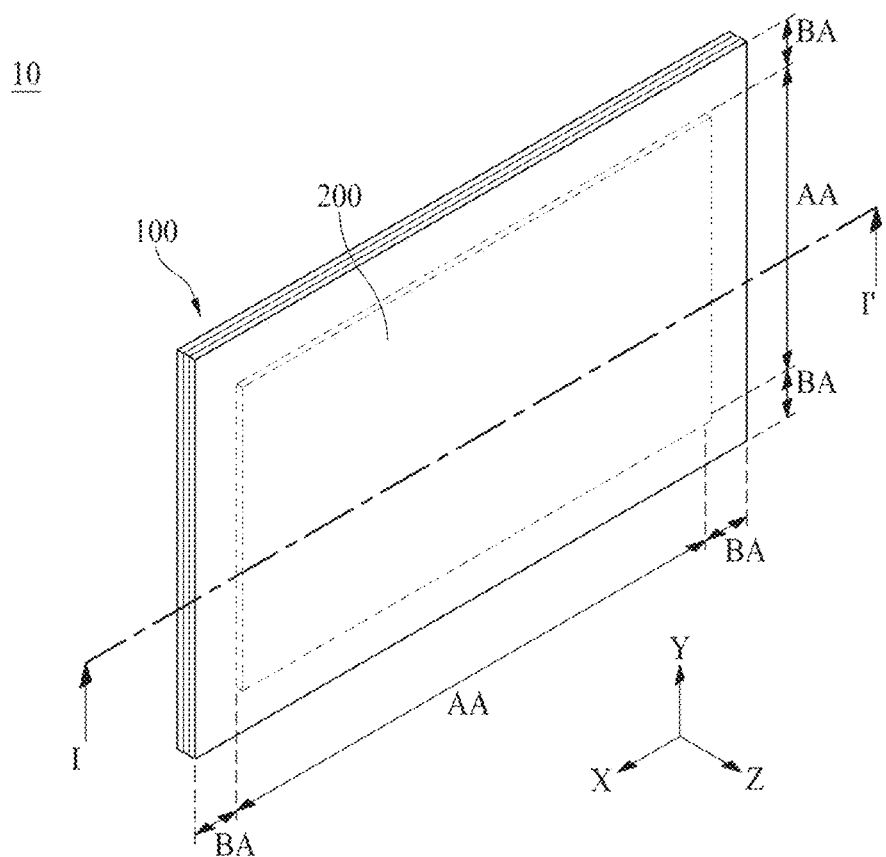
FIG. 1 illustrates a display apparatus according to an embodiment of the present disclosure.

Reference will now be made in detail to the exemplary embodiments of the present disclosure, examples of which may be illustrated in the accompanying drawings.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

Throughout the drawings and the detailed description, unless otherwise described, the same drawing reference numerals should be understood to refer to the same elements, features, and structures. The relative size and depiction of these elements may be exaggerated for clarity, illustration, and convenience. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., may be used. These terms are intended to identify the corresponding elements from the other elements, and basis, order, or number of the corresponding elements should not limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

In the present disclosure, examples of a display apparatus may include a narrow-sense display apparatus such as an organic light emitting display (OLED) module or a liquid crystal module (LCM) including a display panel and a driver for driving the display panel. Also, examples of the display apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the display apparatus may include a narrow-sense display apparatus itself, such as an LCM or an OLED module, and a set device which is a final consumer device or an application product including the LCM or the OLED module.

In some embodiments, an LCM or an OLED module including a display panel and a driver may be referred to as a narrow-sense display apparatus, and an electronic apparatus which is a final product including an LCM or an OLED module may be referred to as a set apparatus. For example, the narrow-sense display apparatus may include a display panel, such as an LCD or an OLED, and a source printed circuit board (PCB) which is a controller for driving the display panel. The set device may further include a set PCB which is a set controller electrically connected to the source PCB to overall control the set apparatus.

A display panel applied to an embodiment of the present disclosure may use all types of display panels such as a liquid crystal display panel, an organic light emitting diode (OLED) display panel, and an electroluminescent display panel, but embodiments are not limited to a specific display panel which is vibrated by a sound generation device according to an embodiment of the present disclosure to output a sound. Also, a shape or a size of a display panel applied to a display apparatus according to an embodiment of the present disclosure is not limited.

For example, if the display panel is the liquid crystal display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is a switching element for adjusting a light transmittance of each of the plurality of pixels, an upper substrate including a color filter and/or a black matrix, and a liquid crystal layer between the array substrate and the upper substrate.

Moreover, if the display panel is the organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a TFT which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, embodiments are not limited to the metal plate, and the display panel may include another structure.

In the present disclosure, the display panel may be applied to vehicles as a user interface module such as a central control panel for automobiles. For example, the display panel may be provided between occupants sitting on two front seats in order for a vibration of the display panel to be transferred to the inside of a vehicle. Therefore, an audio experience in a vehicle is improved in comparison with a case where speakers are disposed on interior sides of the vehicle.

Hereinafter, embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale of each of elements illustrated in the accompanying drawings differs from a real scale, and thus, is not limited to a scale illustrated in the drawings.

In order for a display apparatus to provide a sound, a speaker may be implemented as a film type, thereby thinning a thickness of the display apparatus. A film type vibration generating device may be manufactured to have a large area and may be applied to a display apparatus having a large area, but since the film type vibration module is low in piezoelectric characteristic, it is difficult to apply the film type vibration generating device to a large area due to a low vibration. When ceramic is applied for enhancing a piezoelectric characteristic, the film type vibration module is weak in durability, and a size of ceramic is limited. When a vibration module including a piezoelectric composite including piezoelectric ceramic is applied to a display apparatus, since the piezoelectric composite vibrates in a horizontal direction with respect to a widthwise direction (for example, a horizontal direction with respect to a widthwise direction of the display apparatus), it is unable to sufficiently vibrate the display apparatus in a vertical (or horizontal) direction, and due to this, it is difficult to apply the vibration module to the display apparatus and it is unable to output a desired sound to a forward region in front of the display apparatus. When a film type piezoelectric is applied to a display apparatus, a sound pressure characteristic thereof is lower than that of general speakers such as exciters. When a stacked-type piezoelectric where a film type piezoelectric is configured with a multilayer so as to improve a sound pressure is applied to a display apparatus, power consumption increases, and a thickness of a display apparatus is thickened. When where a vibration generating device is applied to a haptic device, there is a problem where heat occurs due to a vibration of a vibration generating device. Also, a problem occurs where the image quality of a display panel is adversely affected by heat.

Therefore, the inventor has performed various experiments for implementing a vibration generating device having an enhanced heat dissipation characteristic. Through the various experiments, the inventor has invented a display apparatus including a vibration generating device having a new structure, which has a heat dissipation characteristic. This will be described below in detail.

Figure 2:
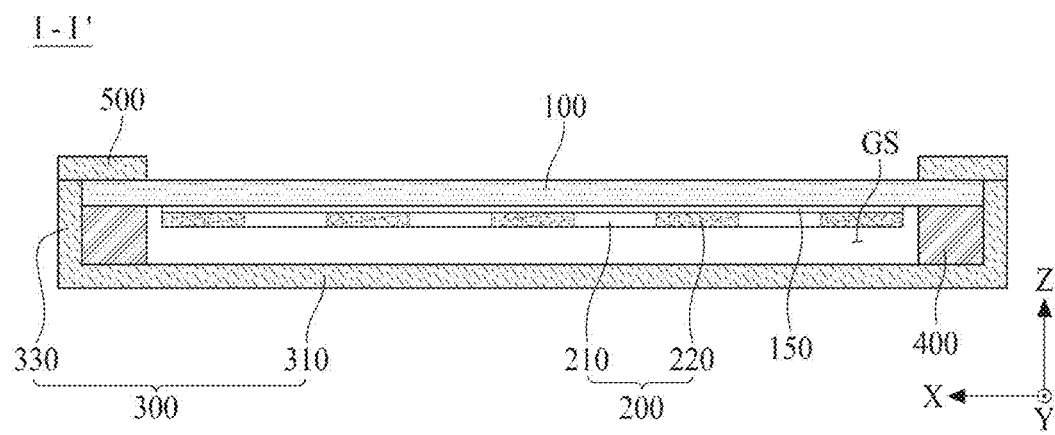
FIG. 2 is a cross-sectional view taken along line I-I' illustrated in FIG. 1.

FIG. 1 illustrates a display apparatus according to an embodiment of the present disclosure. FIG. 2 is a cross-sectional view taken along line I-I' illustrated in FIG. 1.

With reference to FIGS. 1 and 2, the display apparatus according to an embodiment of the present disclosure may include a display panel 100 and a vibration generating device 200 on a rear surface of the display panel 100.

The display panel 100 may display an image (for example, an electronic image or a digital image) and may be implemented as a curved display panel or one of all types of display panels such as a liquid crystal display panel, an organic light emitting diode (OLED) display panel, an electroluminescent display panel, etc. If the display panel 100 vibrates based on a vibration of the vibration generating device 200 to generate a sound (or a sound wave) or to generate a haptic feedback responding to a touch, the display panel 100 is not limited to a specific display panel.

The vibration generating device 200 may generate a sound using the display panel 110 as a vibration plate. A vibration generating device may be referred to as an actuator, an exciter, or a transducer, but the terms are not limited thereto. For example, the vibration generating device 200 may be a sound device which outputs a sound based on an electrical signal.

The display panel 100 according to an embodiment of the present disclosure may include a display area AA which displays an image based on driving of a plurality of pixels and a non-display area BA which surrounds the display area AA.

The display panel 100 according to an embodiment of the present disclosure may include a bending portion which is bent or curved to have a curved shape or a certain curvature radius.

The bending portion of the display panel 100 may be provided in at least one of one periphery and the other periphery of the display panel 100 which are parallel to each other. The one periphery and/or the other periphery, where the bending portion is provided, of the display panel 100 may include only the non-display area BA, or may include a periphery of the display area AA and the non-display area BA. Here, the display panel 100 including the bending portion provided by bending of the non-display area BA may have a structure where a one-side bezel bending structure or a both-side bezel bending structure. Also, the display panel 100 including the periphery of the display area AA and the bending portion provided by bending of the non-display area BA may have a structure where a one-side active bending structure or a both-side active bending structure.

For example, the display panel 100 may display an image in a type such as a top emission type, a bottom emission type, or a dual emission type, based on a structure of a pixel array layer including an anode electrode, a cathode electrode, and an organic compound layer. In the top emission type, visible light emitted from the pixel array layer may be irradiated onto a region in front of a base substrate to allow an image to be displayed, and in the bottom emission type, the visible light emitted from the pixel array layer may be irradiated onto a rearward region behind the base substrate to allow an image to be displayed.

The display panel 100 according to an embodiment of the present disclosure may include a pixel array part disposed in a pixel area which is configured by a plurality of gate lines and/or a plurality of data lines. The pixel array part may include a plurality of pixels which display an image based on a signal supplied through each of signal lines. The signal lines may include a gate line, a data line, a pixel driving power line, etc.

Each of the plurality of pixels may include a pixel circuit layer including a driving thin film transistor (TFT) provided in the pixel area, an anode electrode electrically connected to the driving TFT, a light emitting device layer formed on the anode electrode, and a cathode electrode electrically connected to the light emitting device layer.

The driving TFT may be provided at a transistor region of each pixel area provided in a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments are not limited thereto.

The anode electrode may be provided at an opening region provided in each pixel area and may be electrically connected to the driving TFT.

The light emitting device layer according to an embodiment of the present disclosure may include an organic light emitting device provided on the anode electrode. The organic light emitting device may be implemented so that pixels emit light of the same color (for example, white light) or emit lights of different colors (for example, red light, green light, and blue light).

According to another embodiment of the present disclosure, the light emitting device layer may include a micro light emitting diode device which is electrically connected to each of the anode electrode and the cathode electrode. The micro light emitting diode device may be a light emitting diode implemented as an integrated circuit (IC) type or a chip type and may include a first terminal electrically connected to the anode electrode and a second terminal electrically connected to the cathode electrode. The cathode electrode may be connected to a light emitting device of the light emitting device layer provided at each pixel area.

An encapsulation part may be formed on the substrate to surround the pixel array part, and thus, may prevent oxygen or water (or moisture) from penetrating into the light emitting device layer of the pixel array part. The encapsulation part according to an embodiment of the present disclosure may be formed in a multi-layer structure where an organic material layer and an inorganic material layer are alternately stacked, but embodiments are not limited thereto. The inorganic material layer may prevent oxygen or water (or moisture) from penetrating into the light emitting device layer of the pixel array part. The organic material layer may be formed to have a thickness which is relatively thicker than that of the inorganic material layer, so as to cover particles occurring in a manufacturing process. For example, the encapsulation part may include a first inorganic layer, an organic layer on the first inorganic layer, and a second inorganic layer on the organic layer. The organic layer may be a particle covering layer.

A touch panel may be disposed on the encapsulation part, or may be disposed on a rear surface of the pixel array part.

The display apparatus 10 according to an embodiment of the present disclosure may further include a supporting member 300, configured to support the display panel 100, and a connection member 400 between the display panel 100 and the supporting member 300.

The supporting member 300 may be referred to as the other term such as a cover bottom, a plate bottom, a back cover, a base frame, a metal frame, a metal chassis, a chassis base, or an m-chassis. Therefore, the supporting member 300 may be a supporter which supports the display panel 100 and may be implemented as an arbitrary type frame or a plate structure each disposed on a rear surface of the display apparatus 10.

The supporting member 300 according to an embodiment of the present disclosure may cover the whole rear surface of the display panel 100 with a gap space GS therebetween. For example, the supporting member 300 may include at least one of a glass material, a metal material, and a plastic material. Here, an edge or a sharp corner of the supporting member 300 may have an inclined shape or a curved shape through a chamfer process or a corner rounding process. For example, the glass material of the supporting member 300 may be sapphire glass. As another example, the supporting member 300 including the metal material may include one of aluminum (Al), an Al alloy, a magnesium (Mg) alloy, and an iron (Fe)-nickel (Ni) alloy.

The supporting member 300 according to an embodiment of the present disclosure may additionally cover a side surface of the display panel 100. For example, the supporting member 300 may include a rear surface portion 310 which covers the rear surface of the display panel 100 with the gap space GS therebetween and a side surface portion 330 which is connected to an end of the rear surface portion 310 and covers the side surface of the display panel 100. For example, the rear surface portion 310 may cover a portion or the entire of the rear surface of the display panel 100. For example, the side surface portion 330 may cover a portion or the entire of the side surface of the display panel 100. However, the embodiment of the present disclosure is not limited thereto, and the supporting member 300 may be implemented so that the rear surface portion 310 and the side surface portion 330 are provided as one body. The rear surface of the display panel 100 may be referred to as one surface, a backside surface, a first surface, or a bottom (or lower) surface, but the terms are not limited thereto.

The side surface portion 330 may be implemented as a separated middle frame connected to the supporting member 300. In this case, the side surface portion 330 implemented as the middle frame may cover the supporting member 300, and for example, may cover all of a side surface of the rear surface portion 310 and the side surface of the display panel 100. For example, the side surface portion 330 implemented as the middle frame may include a material which is the same as or different from that of the supporting member 300.

The supporting member 300 according to an embodiment of the present disclosure may be connected to a rear periphery of the display panel 100 by the connection member 400. The connection member 400 may be disposed between the rear periphery of the display panel 100 and a periphery of the supporting member 300 and may attach the display panel 100 on the supporting member 300. The connection member 400 according to an embodiment of the present disclosure may be implemented with a double-sided tape, a single-sided tape, a double-sided adhesive foam pad, or a single-sided adhesive foam pad, but embodiments are not limited thereto.

The display apparatus according to an embodiment of the present disclosure may further include a front member 500 which covers the non-display area BA of the display panel 100.

The front member 500 may have a picture frame shape which includes an opening overlapping the display area AA of the display panel 100. For example, the front member 500 may be connected to the rear surface portion 310 or the middle frame and may cover the non-display area BA of the display panel 100, thereby supporting or fixing the display panel 100. The front member 500 may be disposed at a front periphery of the display panel 100 and may be directly exposed at a user (or a viewer), and due to this, an aesthetic design appearance of the display apparatus may be reduced and a bezel width of the display apparatus may increase. To solve such a problem, according to an embodiment of the present disclosure, the display panel 100 may be connected to the supporting member 300 by the connection member 400, and thus, the front member 500 may be omitted (or removed), thereby decreasing the bezel width of the display apparatus and enhancing the aesthetic design appearance of the display apparatus.

The vibration generating device 200 may be disposed on the rear surface (or a backside surface) of the display panel 100. The vibration generating device 200 may be attached on the rear surface of the display panel 100 by an adhesive member 150.

The adhesive member 150 according to an embodiment of the present disclosure may be disposed between the rear surface of the display panel 100 and the vibration generating device 200. For example, the adhesive member 150 may attach the vibration generating device 200 on the rear surface of the display panel 100 and may be an adhesive or a double-sided adhesive tape including an adhesive layer which is good in an adhesive force or an attaching force. For example, the adhesive layer of the adhesive member 150 may include epoxy, acryl, silicon, urethane, or paraffin wax, but embodiments are not limited thereto. The adhesive layer of the adhesive member 150 may further include an additive such as a tackifier, a wax component, or an anti-oxidation agent. The additive may prevent the adhesive member 150 from being detached (stripped) from the display panel 100 by a vibration of the vibration module 200. For example, the tackifier may be rosin derivative or the like and the wax component may be paraffin wax or the like, but an embodiment of the present disclosure is not limited thereto. For example, the anti-oxidation agent may be a phenol-based anti-oxidation agent, and for example, may be thioester, but embodiments are not limited thereto.

According to another embodiment of the present disclosure, the adhesive member 150 may further include a hollow portion provided between the display panel 100 and the vibration generating device 200. The hollow portion of the adhesive member 150 may provide an air gap between the display panel 100 and the vibration generating device 200. Due to the air gap, a sound wave (or a sound pressure) based on a vibration of the vibration generating device 200 may not be dispersed by the adhesive member 150 and may concentrate on the display panel 100, and thus, the loss of a vibration caused by the adhesive member 150 may be minimized, thereby increasing a sound pressure characteristic of a sound generated based on a vibration of the display panel 100.

The vibration generating device 200 may be implemented as a film type. The vibration generating device 200 may have a thickness which is thinner than that of the display panel 100, and thus, a thickness of the display panel 100 may not increase despite the vibration generating device 200. The vibration generating device 200 may be referred to as a sound generating module, a sound generating device, a film actuator, a film type piezoelectric composite actuator, a film speaker, a film type piezoelectric speaker, or a film type piezoelectric composite speaker, but the terms are not limited thereto.

The vibration generating device 200 according to an embodiment of the present disclosure may include a plurality of first portions 210 and a plurality of second portions 220. For example, the plurality of first portions 210 may have a piezoelectric characteristic, and the plurality of second portions 220 may complement an impact resistance of each of the first portions 210 and may have flexibility.

The plurality of first portions 210 according to an embodiment of the present disclosure may each be configured as an inorganic material portion. The inorganic material portion may include an electroactive material. The electroactive material may have a characteristic where pressure or twisting (or bending) is applied to a crystalline structure by an external force, a potential difference occurs due to dielectric polarization caused by a relative position change of a positive (+) ion and a negative (−) ion, and a vibration is generated by an electric field based on a voltage applied thereto.

Each of the plurality of second portions 220 according to an embodiment of the present disclosure may be configured as an organic material portion and may be disposed to fill a space between the inorganic material portions which are the first portions 210. Each of the organic material portions may be disposed between two adjacent inorganic material portions of the plurality of inorganic material portions, may absorb an impact applied to the inorganic material portions (or the first portions), may release a stress concentrating on the inorganic material portion to enhance the total durability of the vibration generating device 200, and may provide flexibility to the vibration generating device 200. The vibration generating device 200 may have flexibility, and thus, may be bent in a shape matching that of the display panel 100.

Each of the plurality of second portions 220 may be disposed between two adjacent first portions of the plurality of first portions 210. The plurality of first portions 210 and the plurality of second portions 220 may be disposed (or arranged) on the same plane (or the same layer) in parallel. Each of the plurality of second portions 220 may be configured to fill a gap between two adjacent first portions of the plurality of first portions 210 and may be connected to or attached on a first portion 210 adjacent thereto. Therefore, in the vibration generating device 200, vibration energy based on a link in a unit lattice of each first portion 210 may increase by a corresponding second portion 220, and thus, a vibration may increase and a piezoelectric characteristic and flexibility may be secured. Also, in the vibration generating device 200, the second portions 220 and the first portions 210 may be alternately disposed on the same plane in a lengthwise direction X with respect to one side of the vibration generating device 200 and thus may configure a large-area composite film (or an organic/inorganic composite film) having a single-layer structure, and the large-area composite film may have a thin thickness, whereby a thickness of the display apparatus 10 may not increase.

Therefore, in the vibration generating device 200 of the display apparatus according to an embodiment of the present disclosure, an inorganic material portion (a first portion) and an organic material portion (a second portion) may be disposed on the same layer, and thus, an impact transferred to the inorganic material portion may be absorbed by the organic material portion, thereby preventing or reducing the inorganic material portion from being damaged by an external impact applied to the display apparatus and minimizing or reducing the reduction in vibration performance (or the reduction in sound performance) caused by damage.

Moreover, the vibration generating device 200 of the display apparatus according to an embodiment of the present disclosure may include piezoelectric ceramic having a perovskite crystalline structure, and thus, may vibrate (or mechanical displacement) in response to an electrical signal applied from the outside. For example, when an alternating current (AC) voltage is applied to the inorganic material portion (the first portion), the inorganic material portion may alternately contract and expand based on an inverse piezoelectric effect, and thus, the vibration generating device 200 may vibrate based on a bending phenomenon where a bending direction is alternately changed, thereby vibrating the display panel 100 based on the vibration of the vibration generating device 200 to provide a sound or a haptic feedback to a user.

Moreover, the vibration generating device 200 according to an embodiment of the present disclosure may have a size corresponding to the display area AA of the display panel 100. A size of the vibration generating device 200 may be 0.9 to 1.1 times a size of the display area AA, but embodiments are not limited thereto. For example, a size of the vibration generating device 200 may be the same as or approximately equal to that of the display area AA of the display panel 100, and thus, the vibration generating device 200 may cover a most region of the display panel 100. Also, a vibration generated by the vibration generating device 200 may vibrate a whole portion of the display panel 100, and thus, localization of a sound may be high and satisfaction of a user may be improved. Also, a contact area (or panel coverage) between the display panel 100 and the vibration generating device 200 may increase, and thus, a vibration region of the display panel 100 may increase, thereby improving a sound of a middle-low-pitched sound band generated based on a vibration of the display panel 100. Also, in a large-sized display apparatus, a whole portion of the display panel 100 having a large size (or a large area) may vibrate, and thus, localization of a sound based on a vibration of the display panel 100 may be more enhanced, thereby realizing a stereophonic sound effect.

Therefore, the vibration generating device 200 according to an embodiment of the present disclosure may be disposed on the rear surface of the display panel 100 to sufficiently vibrate the display panel 100 in a vertical (or horizontal) direction, thereby outputting a desired sound to a forward region in front of the display apparatus. Also, a material included in the vibration generating device 200 may be implemented in a pattern shape including an organic material portion and an inorganic material portion, and thus, an area (or a size) of the vibration generating device 200 may infinitely increase, whereby panel coverage of the vibration generating device 200 may increase with respect to the display panel 100 to enhance a sound characteristic based on a vibration of the display panel 100. Also, the vibration generating device 200 may be implemented with one film, and thus, may be slimmed, thereby reducing or preventing the increase in a driving voltage. For example, the vibration generating device 200 may be configured to have a wide area corresponding to the same size as that of the display panel 100, and thus, a sound pressure characteristic of a low-pitched sound band which is a drawback of a film type piezoelectric or a stacked type piezoelectric may be improved and the driving voltage may be reduced. Also, the vibration generating device 200 according to an embodiment of the present disclosure may include the inorganic material portion and the organic material portion and may be implemented as a thin film type, and thus, may be integrated into or equipped in the display apparatus without interference caused by a mechanical element and/or another element configuring the display apparatus.

The vibration generating device 200 may vibrate based on an electrical signal to vibrate the display panel 100. For example, the vibration generating device 200 may be a sound generating device which vibrates based on a voice signal synchronized with an image displayed by the display panel 100 to vibrate the display panel 100, thereby generating a sound. As another example, the vibration generating device 200 may be a haptic device which vibrates based on a haptic feedback signal (or a tactile feedback signal) synchronized with a user touch applied to a touch panel (or a touch sensor layer) disposed in or embedded into the display panel 100 to vibrate the display panel 100. For example, the vibration generating device 200 may be a haptic device which vibrates the display panel 100 to output a feedback based on an action of a user. Accordingly, the display panel 100 may vibrate based on a vibration of the vibration generating device 200 to provide a user (or a viewer) with at least one of a sound and a haptic feedback.

Figure 3:
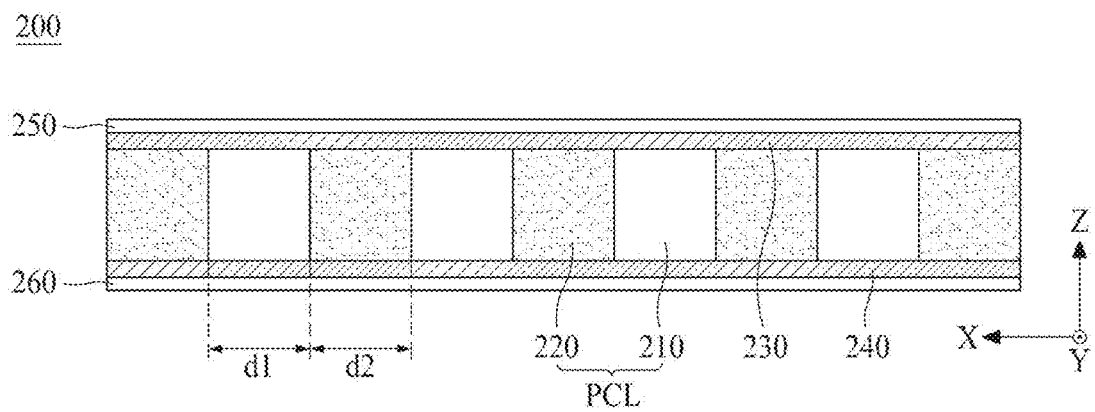
FIG. 3 is a cross-sectional view of a vibration generating device according to an embodiment of the present disclosure.

FIG. 3 is a cross-sectional view of a vibration generating device according to an embodiment of the present disclosure.

With reference to FIG. 3 in conjunction with FIG. 2, the vibration generating device 200 according to an embodiment of the present disclosure may include a piezoelectric composite layer PCL, a first electrode 230, and a second electrode 240.

The piezoelectric composite layer PCL may include a plurality of first portions 210 and a plurality of second portions 220 each disposed between two adjacent first portions of the plurality of first portions 210.

Each of the plurality of first portions 210 according to an embodiment of the present disclosure may include an inorganic material or a piezoelectric material which each vibrates based on a piezoelectric effect (or a piezoelectric characteristic) caused by an electric field. For example, each of the plurality of first portions 210 may be referred to as an electroactive portion, an inorganic material portion, a piezoelectric material portion, or a vibration portion, but embodiments are not limited thereto.

Each of the plurality of first portions 210 according to an embodiment may be formed of a ceramic-based material for generating a relatively high vibration, or may be formed of piezoelectric ceramic having a perovskite-based crystalline structure. The perovskite crystalline structure may have a piezoelectric effect and an inverse piezoelectric effect and may be a plate-shaped structure having orientation. The perovskite crystalline structure may be represented by a chemical formula "$ABO_3$". Here, A may include a divalent metal element, and B may include a tetravalent metal element. For example, in the chemical formula "$ABO_3$", A and B may be cations, and O may be anions. For example, the chemical formula "$ABO_3$" may include one of $PbTiO_3$, $PbZrO_3$, $BaTiO_3$, and $SrTiO_3$, but embodiments are not limited thereto.

When the perovskite crystalline structure includes a center ion (for example, $PbTiO_3$), a position of a Ti ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal, orthorhombic, or rhombohedral structure corresponding to an unsymmetric structure, and thus, a piezoelectric effect may be generated. In a tetragonal, orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

For example, the inorganic material portion provided in each of the plurality of first portions 210 may include one or more materials of lead (Pb), zirconium (Zr), titanium (Ti), zinc (Zn), nickel (Ni), and niobium (Nb), but embodiments are not limited thereto.

As another example, the inorganic material portion provided in each of the plurality of first portions 210 may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but embodiments are not limited thereto. Also, the inorganic material portion may include at least one of $CaTiO_3$, $BaTiO_3$, and $SrTiO_3$ each without Pb, but embodiments are not limited thereto.

Each of the plurality of first portions 210 may include a polygonal pattern. For example, the plurality of first portions 210 may each include a line pattern having a first width d1. For example, the plurality of first portions 210 may be spaced apart from one another by a second width d2 (or a certain interval) in a first direction X and may be disposed in parallel in a second direction Y intersecting the first direction X. Each of the plurality of first portions 210 may have the same size (for example, the same width, area, or volume) within a process error (or an allowable error) range occurring in a manufacturing process.

Each of the plurality of second portions 220 according to an embodiment of the present disclosure may have modulus and viscoelasticity which are lower than those of each first portion 210, and thus, may enhance the reliability of each first portion 210 vulnerable to an impact due to a fragile characteristic. For example, when the vibration generating device 200 for vibrating the display panel 100 has an impact resistance and high stiffness, the vibration generating device 200 may have a maximum vibration characteristic. In order for the vibration generating device 200 to have an impact resistance and high stiffness, the plurality of second portions 220 may each include a material having a relatively high damping factor (tan 6) and relatively high stiffness. For example, the plurality of second portions 220 may each include a material having a damping factor (tan 6) of about 0.1 [Gpa] to about 1 [Gpa] and relatively high stiffness of about 0 [Gpa] to about 10 [Gpa]. Also, a damping factor (tan 6) and a stiff characteristic may be described based on a correlation between a loss coefficient and modulus, and in this case, the plurality of second portions 220 may each include a material having a loss coefficient of about 0.01 to about 1 and modulus of about 1 [Gpa] to about 10 [Gpa].

The organic material portion provided in each of the plurality of second portions 220 may include an organic material or an organic polymer which each has a flexible characteristic in comparison with the inorganic material portion which is each of the first portions 210. For example, each of the plurality of second portions 220 may include an organic material, an organic polymer, an organic piezoelectric material, or an organic non-piezoelectric material. For example, each of the plurality of second portions 220 may be referred to as an adhesive portion, an elastic portion, a bending portion, a damping portion, or a flexible portion, but embodiments are not limited thereto.

An organic material portion according to an embodiment of the present disclosure may include at least one of an organic piezoelectric material and an organic non-piezoelectric material.

An organic material portion including an organic piezoelectric material may absorb an impact applied to an inorganic material portion (or a first portion), and thus, may enhance the total durability of the vibration generating device 200 and may provide a piezoelectric characteristic corresponding to a certain level or more. The organic piezoelectric material according to an embodiment of the present disclosure may be an organic material having an electroactive material. For example, the organic piezoelectric material may include at least one of polyvinylidene fluoride (PVDF), β-Polyvinylidene fluoride (β-PVDF), and polyvinylidene-trifluoroethylene (PVDF-TrFE), but embodiments are not limited thereto.

An organic material portion including an organic non-piezoelectric material may include a curable resin composition and an adhesive including the curable resin composition, and thus, may absorb an impact applied to an inorganic material portion (or a first portion), thereby enhancing the total durability of the vibration generating device 200. The organic non-piezoelectric material according to an embodiment of the present disclosure may include at least one of an epoxy-based polymer, an acryl-based polymer, and a silicon-based polymer, but embodiments are not limited thereto.

For example, an organic material portion including an organic non-piezoelectric material may include an adhesion promoter for adhesiveness between epoxy resin and an inorganic material portion, for a high stiff characteristic needed for the vibration generating device 200. For example, the adhesion promoter may be phosphate or the like. The organic material portion may be cured by at least one curing process of a thermal curing process and a photo-curing process. In a process of curing the organic material portion, solvent free type epoxy resin may be used for preventing the thickness uniformity of the vibration generating device 200 from being reduced by contraction of the organic material portion caused by volatilization of a solvent.

Moreover, the organic material portion including the organic non-piezoelectric material may further include a reinforcing agent, for a damping characteristic in addition to high stiffness of the vibration generating device 200. For example, the reinforcing agent may be methylmethacrylate-butadiene-styrene (MBS) having a core shell type, and a content of the reinforcing agent may about 5 wt % to about 40 wt %. The reinforcing agent may be an elastic body having the core cell type and may have a high coupling force to epoxy resin such as an acryl-based polymer, and thus, may enhance an impact resistance or a damping characteristic of the vibration generating device 200.

Each of the plurality of second portions 220 may include a polygonal pattern. Each of the plurality of second portions 220 may be disposed between two adjacent first portions of the plurality of first portions 210. The plurality of first portions 210 and the plurality of second portions 220 may be disposed (or arranged) on the same plane (or the same layer) in parallel. Each of the plurality of second portions 220 may be configured to fill a gap between two adjacent first portions of the plurality of first portions 210 and may be connected to or attached on a first portion 210 adjacent thereto. For example, the plurality of second portions 220 may each include a line pattern having a second width d2 and may be disposed in parallel with a corresponding first portion 210 between two adjacent second portions 220. Each of the plurality of second portions 220 may have the same size (for example, the same width, area, or volume) within a process error (or an allowable error) range occurring in a manufacturing process.

A size of each of the second portions 220 may be the same as or different from that of each first portion 210. For example, a size of each first portion 210 and a size of each second portion 220 may be set based on a requirement condition including the vibration characteristic and/or flexibility of the vibration generating device 200.

In the piezoelectric composite layer PCL, the first portions 210 including an inorganic material and having a piezoelectric characteristic and the second portions 220 including an organic material and having flexibility may be alternately repeated and connected to one another, and thus, the piezoelectric composite layer PCL may have a thin film type. Therefore, the piezoelectric composite layer PCL may be bent based on a shape of the display panel 100 and may have a size corresponding to the display panel 100 or may have a size for realizing a vibration characteristic or a sound characteristic which is each set based on a vibration of the display panel 100. For example, a size of each first portion 210 and a size of each second portion 220 may be set based on a piezoelectric characteristic and flexibility. For example, in a display apparatus requiring a piezoelectric characteristic rather than flexibility, a size of each first portion 210 may be adjusted to be greater than that of each second portion 220. As another example, in a display apparatus requiring flexibility rather than a piezoelectric characteristic, a size of each second portion 220 may be adjusted to be greater than that of each first portion 210. Accordingly, the piezoelectric composite layer PCL may be adjusted based on a characteristic needed for a display apparatus, and thus, it may be easy to design the piezoelectric composite layer PCL.

The first electrode 230 may be disposed on a first surface (or a front surface) of the piezoelectric composite layer PCL. The first electrode 230 according to an embodiment of the present disclosure may include a transparent conductive material, a semitransparent conductive material, or an opaque conductive material. For example, examples of the transparent conductive material or the semitransparent conductive material may include indium tin oxide (ITO) or indium zinc oxide (IZO), but embodiments are not limited thereto. Examples of the opaque conductive material may include aluminum (Al), copper (Cu), gold (Au), silver (Ag), molybdenum (Mo), and Mg or an alloy thereof, but embodiments are not limited thereto.

The second electrode 240 may be disposed on a second surface (or a rear surface), which is opposite to the first surface, of the piezoelectric composite layer PCL. The second electrode 240 according to an embodiment of the present disclosure may include a transparent conductive material, a semitransparent conductive material, or an opaque conductive material. For example, the second electrode 240 may include the same material as that of the first electrode 230.

The vibration generating device 200 according to an embodiment of the present disclosure may further include a first protection layer 250 and a second protection layer 260.

The first protection layer 250 may be disposed on the first electrode 230 and may protect the first surface of the piezoelectric composite layer PCL or the first electrode 230. For example, the first protection layer 250 may be a polyimide (PI) film or a polyethyleneterephthalate (PET) film, but embodiments are not limited thereto.

The second protection layer 260 may be disposed on the second electrode 240 and may protect the second surface of the piezoelectric composite layer PCL or the second electrode 240. For example, the second protection layer 260 may be a polyimide (PI) film or a polyethyleneterephthalate (PET) film, but embodiments are not limited thereto.

When a piezoelectric composite layer including the first portion 210 and the second portion 220 is attached on a rear surface of a display panel, the piezoelectric composite layer may be degraded by heat occurring due to a vibration of the piezoelectric composite layer and heat caused by the emission of light from a light emitting device layer included in the display panel, and due to this, the display panel may be degraded, causing a problem where the lifetime of light emitting device layer is adversely affected and the image quality of the display panel is adversely affected. For example, when a vibration generating device is implemented as a haptic device, since a vibration should be performed at a very fast speed, heat caused by a vibration of the vibration generating device may more occur. For example, when a vibration generating device is implemented as a haptic device using an ultrasonic wave, since the ultrasonic wave is high in frequency and is short in wavelength, the vibration generating device may generate a strong vibration, but since a vibration should be performed at a very fast speed, the amount of current may increase and heat caused by a high vibration frequency may occur, causing the heating of the vibration generating device. Therefore, the inventor has performed various experiments for preventing the lifetime of a display apparatus from being reduced due to the heating of a vibration generating device and for decreasing power consumption. Through the various experiments, the inventor has invented a display apparatus having a new structure including a vibration generating device having a new structure, which may enhance a heat dissipation characteristic of the vibration generating device and may increase the lifetime of the display apparatus. This will be described below.

Figure 4A:
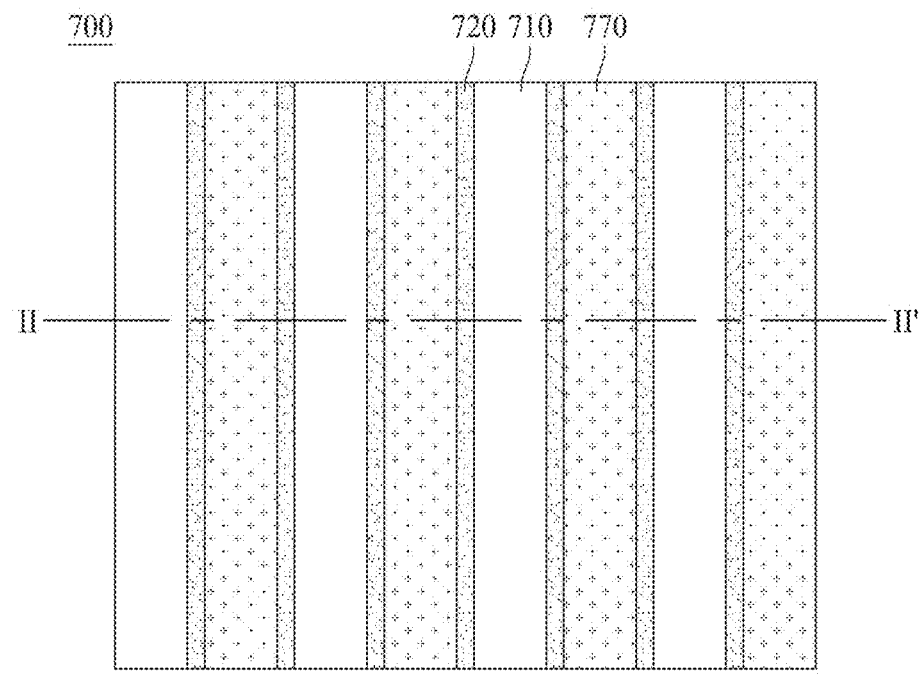
FIG. 4A illustrates a vibration generating device according to another embodiment of the present disclosure.
Figure 4B:
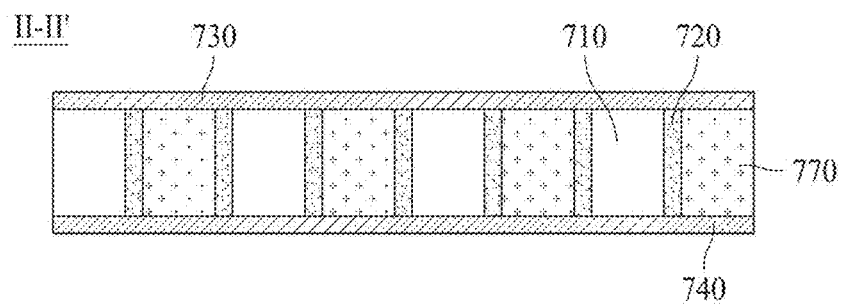
FIG. 4B is a cross-sectional view taken along line II-II' illustrated in FIG. 4A.

FIG. 4A illustrates a vibration generating device according to another embodiment of the present disclosure. FIG. 4B is a cross-sectional view taken along line II-II' illustrated in FIG. 4A.

With reference to FIGS. 4A and 4B, the vibration generating device 700 according to another embodiment of the present disclosure may include a first portion 710, a second portion 720, and a third portion 770.

Descriptions of the first portion 710 and the second portion 720 are the same as descriptions given above with reference to FIGS. 1 to 3, and thus, their detailed descriptions are omitted.

For example, the first portion 710 may have a piezoelectric characteristic, and the second portion 720 may have flexibility. For example, the first portion 710 may include an inorganic material portion, and the second portion 720 may include an organic material portion. For example, the first portion 710 and the second portion 720 may each include a piezoelectric composite layer PCL. For example, the first portion 710 and the second portion 720 may each be a vibration portion.

The third portion 770 may be disposed near the piezoelectric composite layer PCL. For example, the third portion 770 may be disposed between adjacent piezoelectric composite layers PCL. For example, the third portion 770 may be disposed near the second portion 720. For example, the third portion 770 may be disposed between adjacent second portions 720. For example, the third portion 770 may include a heat dissipation portion or a member having a heat dissipation characteristic. For example, the third portion 770 may include a thermoelectric device. A thermoelectric phenomenon may be reversible or direct energy conversion between heat and electricity and may be a phenomenon which occurs due to the movement of an electron and a hole included in a material. The thermoelectric phenomenon may be classified into Peltier effect which uses a temperature difference between both ends caused by a current applied to a thermoelectric material or uses a thermal gradient, Seebeck effect where electricity is generated from a temperature difference between both ends of a material, and Thomson effect where heat or heat absorption occurs when a current is applied to one material when a partial temperature difference occurs in the one material. The thermoelectric device according to an embodiment of the present disclosure may be implemented with a device having one or more of Peltier effect, Seebeck effect, and Thomson effect. The third portion 770 may be configured with one or more of an N-type device, a P-type device, and a P-N junction device. For example, the P-type device may include $Bi_{0.5}Sb_{1.5}Te_3$ or $Bi_{0.3}Sb_{1.7}Te_3$, but embodiments are not limited thereto. For example, the N-type device may include $Bi_2Te_3$ and $Bi_2Se_{0.3}Te_{0.7}$, but embodiments are not limited thereto.

The vibration generating device 700 may include a first electrode 730 disposed on an upper surface thereof and a second electrode 740 disposed on a lower surface thereof. The vibration generating device 700 may include the first electrode 730 disposed on an upper surface of each of the first portion 710, the second portion 720, and the third portion 730 and the second electrode 740 disposed on a lower surface of each of the first portion 710, the second portion 720, and the third portion 730. The first electrode 730 and the second electrode 740 may be used as the same electrodes. For example, the first electrode 730 may be disposed on the lower surface of the vibration generating device 700, and the second electrode 740 may be disposed on the upper surface of the vibration generating device 700.

The first electrode 730 may be a signal electrode for applying a voltage to the vibration generating device 700. The second electrode 740 may be a ground electrode. For example, by applying a voltage to the first electrode 730 of the vibration generating device 700, a cooling effect may be realized at the second electrode 740 side. For example, when the third portion 770 is implemented with a thermoelectric device having Thomson effect, the first electrode 730 may be a heat dissipation surface and the second electrode 740 may be a cooling surface, based on a partial temperature difference of the third portion 770. For example, the vibration generating device 700 may be placed so that the second electrode 740 which is the ground electrode is disposed on a rear surface of a display panel 100, and thus, may be implemented to cool heat of the display panel 100 and/or heat of the vibration generating device 700. Accordingly, the vibration generating device 700 according to an embodiment of the present disclosure may be configured with a film which is one composite including the third portion 770 having a heat dissipation characteristic, thereby realizing a heat dissipation characteristic and a vibration characteristic simultaneously. Also, the vibration generating device 700 may be configured to have an effect where heat, occurring when the first portion 710 and the second portion 720 are vibrating, is cooled by the third portion 770.

As another example, when the third portion 770 is implemented with a thermoelectric device having Peltier effect, the first electrode 730 may be a heat dissipation surface, and the second electrode 740 may be a cooling surface. For example, the vibration generating device 700 may be placed so that the second electrode 740 which is the ground electrode is disposed on the rear surface of the display panel 100, and thus, may be implemented to cool heat caused by a vibration of the vibration generating device 700. Accordingly, heat caused by a vibration of the vibration generating device 700 may be reduced, and thus, an adverse influence on the image quality of the display panel 100 may be reduced, thereby enhancing a lifetime of the display panel 100.

As another example, when the third portion 770 is implemented with a thermoelectric device having Seebeck effect, the first electrode 730 may be a portion having a temperature which is relatively lower than that of the second electrode 740. For example, the first electrode 730 may be a portion which is exposed at air or contacts a supporting member 300 or the like. The second electrode 740 may be a portion having a temperature which is relatively higher than that of the first electrode 730. For example, the second electrode 740 may be a portion which contacts the display panel 100. The vibration generating device 700 may be placed so that the second electrode 740 which is a portion having a relatively high temperature is disposed on the rear surface of the display panel 100, and thus, a flow of a current may be formed based on a temperature difference between the first electrode 730 and the second electrode 740, whereby heat of the display panel 100 may be stored as power. Accordingly, the consumption of a driving power of the vibration generating device 700 may be reduced.

A size of the piezoelectric composite layer PCL may be the same as or different from that of the third portion 770. For example, a size of the piezoelectric composite layer PCL may be equal to or greater than that of the third portion 770. For example, a size of the third portion 770 may be greater than that of the second portion 720. For example, a size of the first portion 710 and a size of the third portion 770 may be greater than that of the second portion 720. Accordingly, as a size of the first portion 710 and/or a size of the third portion 770 are/is greater or longer than that of the second portion 720, a piezoelectric characteristic and a heat dissipation characteristic may be enhanced.

The first electrode layer 730 according to an embodiment of the present disclosure may include a transparent conductive material, a semitransparent conductive material, or an opaque conductive material. For example, examples of the transparent conductive material or the semitransparent conductive material may include indium tin oxide (ITO) or indium zinc oxide (IZO), but embodiments are not limited thereto. Examples of the opaque conductive material may include aluminum (Al), copper (Cu), gold (Au), silver (Ag), molybdenum (Mo), and Mg or an alloy thereof, but embodiments are not limited thereto.

The second electrode 740 may be disposed on a second surface (or a rear surface), which is opposite to the first surface, of the vibration generating device 700. The second electrode 740 according to an embodiment of the present disclosure may include a transparent conductive material, a semitransparent conductive material, or an opaque conductive material. For example, the second electrode 740 may include the same material as that of the first electrode 730, but embodiments are not limited thereto.

According to another embodiment of the present disclosure, the vibration generating device 700 may be a sound generating device which vibrates based on a voice signal synchronized with an image displayed by the display panel 100 to vibrate the display panel 100, thereby generating a sound. As another example, the vibration generating device 700 may be a haptic device which vibrates based on a haptic feedback signal (or a tactile feedback signal) synchronized with a user touch applied to a touch panel (or a touch sensor layer) disposed on the display panel 100 or embedded into the display panel 100 to vibrate the display panel 100. For example, the vibration generating device 700 may be a haptic device which vibrates the display panel 100 to output a feedback based on an action of a user. For example, the vibration generating device 700 may be implemented with one or more of a sound generating device and a haptic device.

In a piezoelectric composite layer including the first portion 710 and the second portion 720, driving of the third portion 770 and the piezoelectric composite layer should be considered for implementing the third portion 770 having a heat dissipation characteristic by using a film which is one composite. When driving of the first portion 710 and the second portion 720 and driving of the third portion 770 are independently performed, a problem may occur due to different driving methods. Due to this, a driving circuit may be complicated, a problem may occur where a size of the driving circuit for driving each element increases, and a problem may occur where forming of electrodes is complicated due to independent driving. Also, when the third portion 770 is provided along with the first portion 710 and the second portion 720, an efficiency of the third portion 770 may be reduced. Hereinafter, driving of the piezoelectric composite layer and the third portion 770 will be described in detail with reference to FIGS. 5A to 5C.

Figure 5A:
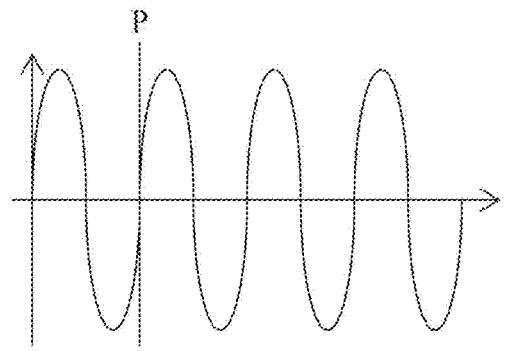
FIGS. 5A to 5C illustrate a driving waveform of a vibration generating device according to another embodiment of the present disclosure.
Figure 5B:
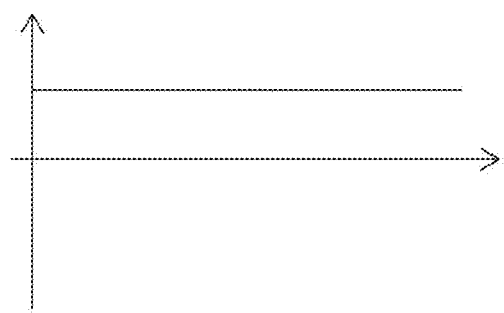
Figure 5C:
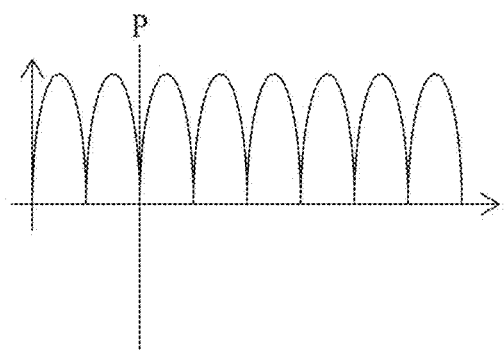

FIGS. 5A to 5C illustrate a driving waveform of a vibration generating device according to another embodiment of the present disclosure.

FIG. 5A shows a driving waveform of each of the first portion 710 and the second portion 720 each including a piezoelectric composite layer. The first portion 710 and the second portion 720 each including a piezoelectric composite layer may perform alternating current (AC) driving, and thus, may alternately contract and expand based on an inverse piezoelectric effect, thereby performing a vibration based on a bending phenomenon where a bending direction is alternately changed.

FIG. 5B shows a driving waveform of the third portion 770. The third portion 770 may perform direct current (DC) driving, and thus, when a direction of a current flowing in the third portion 770 is changed, the heat dissipation surface and the cooling surface described above with reference to FIG. 4 may functionally switch therebetween. Therefore, when DC driving of the first portion 710 and the second portion 720 each including a piezoelectric composite layer is applied to the third portion 770, heat may be dissipated to a light emitting device layer of the display panel 100. When a constant current is applied to a diode which is additionally provided for driving the third portion 770, the first and second portions 710 and 720 which should vibrate twice during one period P may vibrate once during one period P, causing a problem where the strength of a vibration is weakened.

When the first portion 710, the second portion 720, and the third portion 770 are independently driven, a separate driver may be needed, and driving waveforms thereof may differ, causing a problem where a vibration characteristic and a heat dissipation characteristic are reduced. Accordingly, the inventor has recognized that a ripple current wave should be implemented for simultaneously driving the first portion 710, the second portion 720, and the third portion 770.

As another example, when a method of offsetting a waveform of FIG. 5B to a waveform of FIG. 5A is implemented, for example, when only a DC offset is applied, the strength of an electric field may increase, and due to this, the first portion 710, the second portion 720, and the third portion 770 may be damaged. Also, when only the DC offset is applied, the first portion 710, the second portion 720, and the third portion 770 may vibrate once during one period P, and due to this, a problem where a vibration characteristic is reduced may occur.

As shown in FIG. 5C, a driver of the vibration generating device 700 may configure a bridge rectifier circuit to rectify an AC voltage to a ripple current wave, and thus, the first portion 710 and the second portion 720 may vibrate twice during one period P to maintain vibration strength, thereby improving a portion where a vibration characteristic thereof is reduced. Also, a DC voltage may be applied to the third portion 770, and thus, the third portion 770 may cool heat at a desired cooling surface. Accordingly, the first portion 710, the second portion 720, and the third portion 770 may be simultaneously driven, thereby implementing the vibration generating device 700 having a vibration characteristic and a heat dissipation characteristic.

The inventor has recognized that the third portion 770 having a heat dissipation characteristic should be implemented with a film corresponding to one composite without an increase in thickness of a vibration generating device, for implementing the third portion 770 at a piezoelectric composite layer including the first portion 710 and the second portion 720. In the vibration generating device 700, a firing or sintering temperature of each of the first portion 710 and the second portion 720 each including a piezoelectric composite layer may differ from a firing or sintering temperature of the third portion 770, and due to this, there may be a problem where it is difficult to implement the third portion 770 with a film which is one composite. Due to this, there may be a problem where it is difficult to simultaneously perform firing or sintering of the first and second portions 710 and 720 and firing or sintering of the third portion 770, and due to a firing or sintering temperature difference, the first to third portions 710, 720, and 730 may be damaged. Hereinafter, therefore, a method of individually configuring each of the first to third portions 710, 720, and 730 with a film corresponding to one composite will be described in detail.

This will be described below with reference to FIGS. 6A to 6F.

FIGS. 6A to 6F illustrate a method of manufacturing a vibration generating device according to another embodiment of the present disclosure.

Figure 6A:
FIGS. 6A to 6F illustrate a method of manufacturing a vibration generating device according to another embodiment of the present disclosure.

With reference to FIG. 6A, an inorganic material mother substrate having a piezoelectric characteristic may be manufactured through a pre-process. The inorganic material mother substrate may have a plate shape, but embodiments are not limited thereto. The pre-process according to an embodiment of the present disclosure may mix and dry ceramic raw materials, crystallize a crystalline structure through a firing or sintering process, and may manufacture an inorganic material mother substrate 701 by performing a molding process and a sintering process at least once. The sintering process may use heat, pressure, and spark plasma, but embodiments are not limited thereto. The firing or sintering temperature of the inorganic material mother substrate 701 may be 1,000° C. or more, but embodiments are not limited thereto. For example, when an additive such as a sintering agent is added to the inorganic material mother substrate 701, the firing or sintering temperature of the inorganic material mother substrate 701 may be 1,000° C. or less.

Figure 6B:
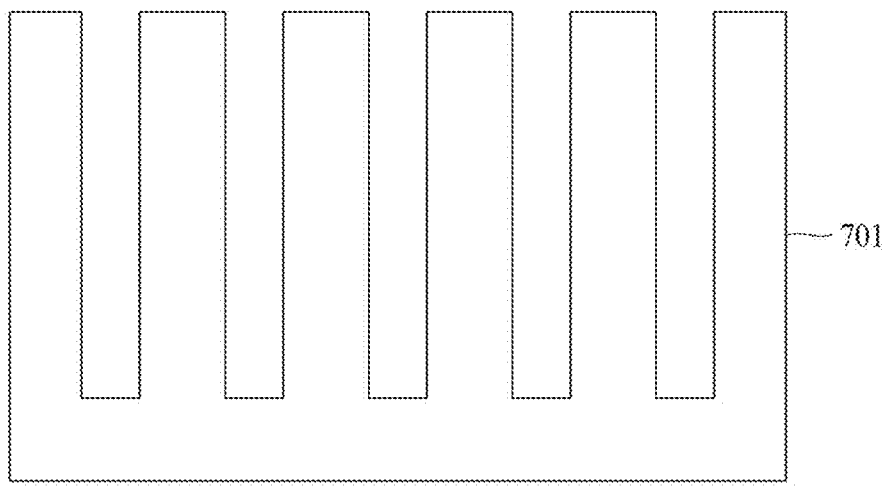

With reference to FIGS. 6A and 6B, a groove or a trench may be formed between adjacent portions of the inorganic material mother substrate 701 using a process of dicing or sawing the inorganic material mother substrate 701. The inorganic material mother substrate 701 may be a first portion.

Figure 6C:
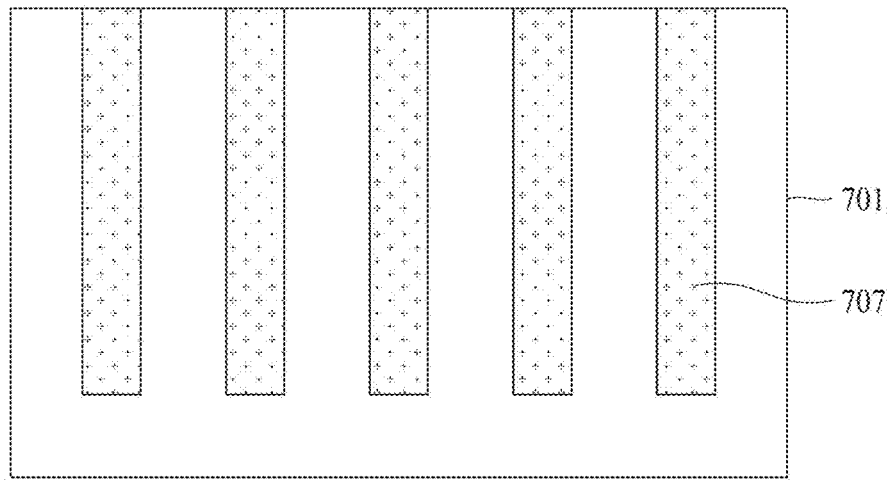

A material 707 of a third portion may be filled into the groove or the trench between adjacent portions of the inorganic material mother substrate 701 (FIG. 6C). The material 707 of the third portion may be formed by a screen printing or inkjet printing process, but embodiments are not limited thereto. Subsequently, the material 707 of the third portion may be crystallized or recrystallized through a thermal treatment process. A firing or sintering temperature of the material 707 of the third portion may be about 500° C., but embodiments are not limited thereto. The material 707 of the third portion may be the third portion.

Figure 6D:
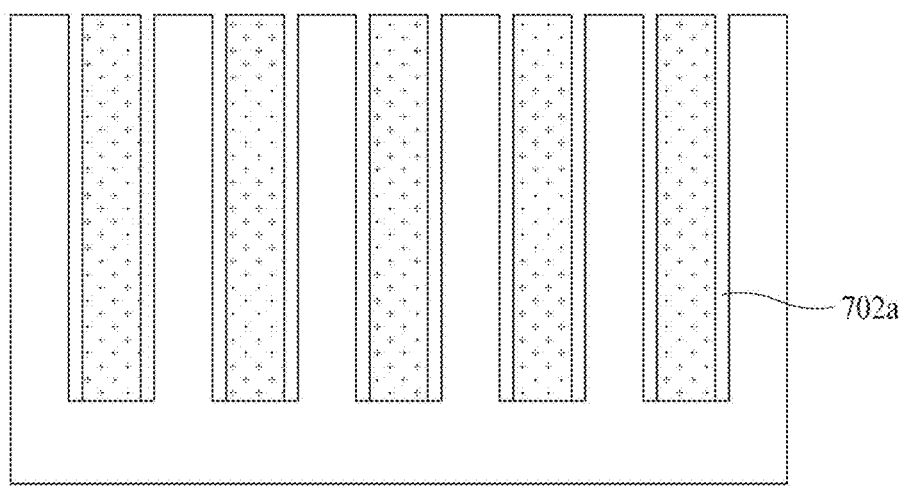
Figure 6E:
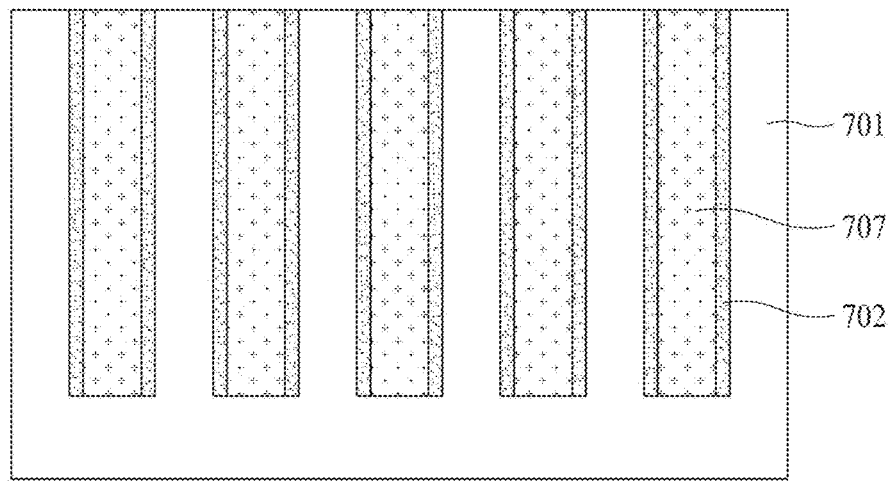

Moreover, a groove or trench 702a may be formed in each of both sides of the material 707 of the third portion (FIG. 6D). A material 702 of a second portion may be filled into the groove or trench 702a (FIG. 6E). The material 702 of the second portion may be cured through a thermal treatment process. The material 702 of the second portion may be the second portion.

Figure 6F:
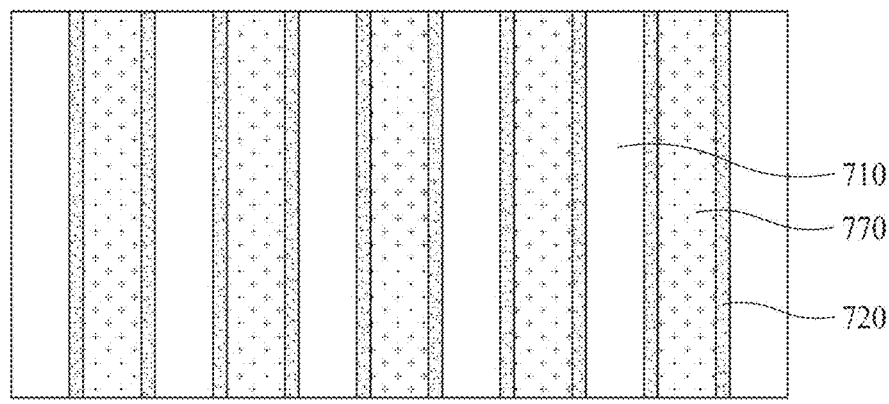

As in FIG. 6F, the first portion 710, the second portion 720, and the third portion 770 of the vibration generating device may be formed by a process such as a lapping process or a cutting process. For example, the cutting process may be performed by at least one of a wire sawing process, a scribing process, a blade dicing process, a stealth dicing process, and a thermal laser separation (TLS) process, but embodiments are not limited thereto.

For example, when the first portion 710 is formed, the second portion 720 is formed, and the third portion 770 is formed, the second portion 720 may be damaged due to a firing or sintering temperature difference between the second portion 720 and the third portion 770. For example, when the third portion 770 is formed, the first portion 710 is formed, and the second portion 720 is formed, the second portion 720 and the third portion 770 may be damaged due to a firing or sintering temperature difference between the third portion 770 and the first portion 710 and a firing or sintering temperature difference between the first portion 710 and the second portion 720. Therefore, when the first portion 710 is formed, the third portion 770 is formed, and the second portion 720 is formed, for preventing the damages of the first to third portions 710, 720, and 770, the damages of the first to third portions 710, 720, and 770 may be prevented based on a firing or sintering temperature difference between the first portion 710 and the third portion 770 and a firing or sintering temperature difference between the second portion 720 and the third portion 770.

Figure 7A:
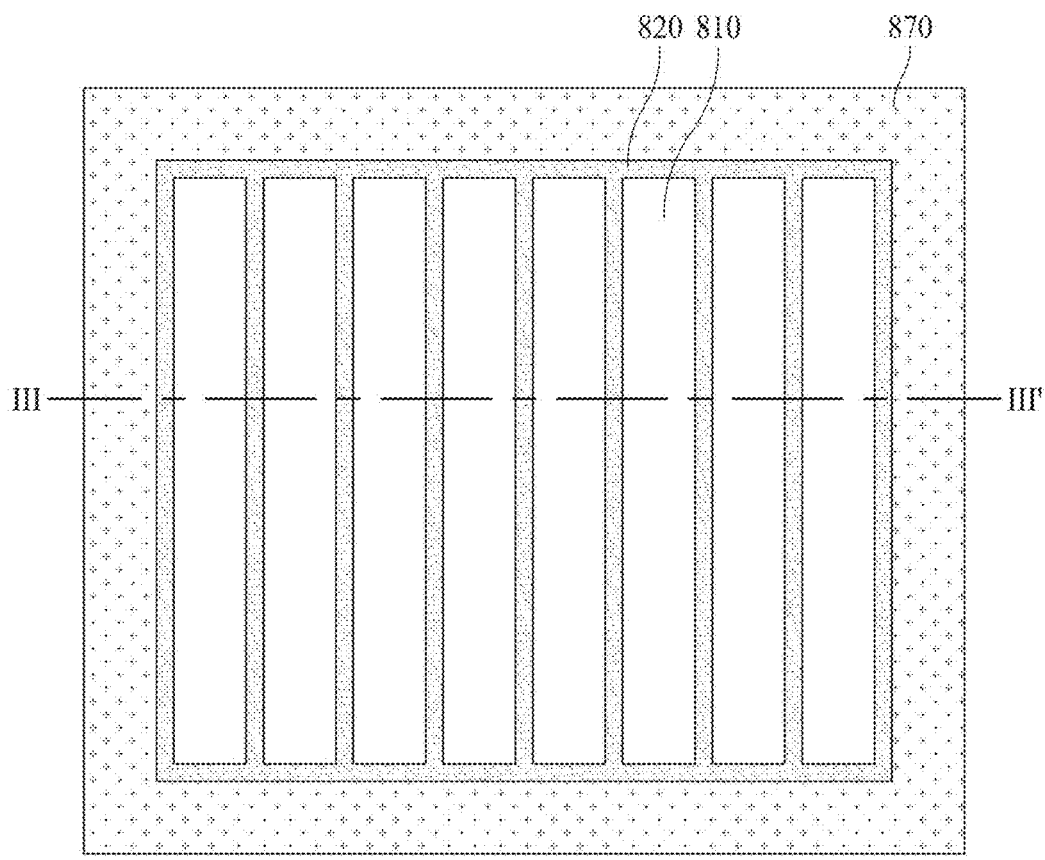
FIG. 7A illustrates a vibration generating device according to another embodiment of the present disclosure.
Figure 7B:
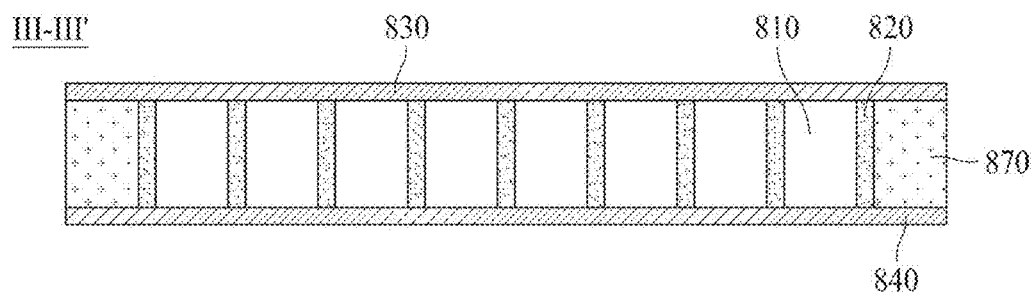
FIG. 7B is a cross-sectional view taken along line III-III' illustrated in FIG. 7A.

FIG. 7A illustrates a vibration generating device 800 according to another embodiment of the present disclosure, and FIG. 7B is a cross-sectional view taken along line III-III' illustrated in FIG. 7A.

With reference to FIGS. 7A and 7B, the vibration generating device 800 according to another embodiment of the present disclosure may include a first portion 810, a second portion 820, and a third portion 870.

Descriptions of the first portion 710 and the second portion 720 are the same as descriptions given above with reference to FIGS. 1 to 4B, and thus, their detailed descriptions are omitted.

For example, the first portion 810 may include an inorganic material portion, and the second portion 820 may include an organic material portion. For example, the first portion 810 and the second portion 820 may each include a piezoelectric composite layer PCL. For example, the first portion 810 and the second portion 820 may each be a vibration portion.

The third portion 870 may be disposed near the piezoelectric composite layer PCL. For example, the third portion 870 may be disposed outside the piezoelectric composite layers PCL. The third portion 870 may be disposed near the second portion 820. For example, the third portion 870 may be disposed to surround the first portion 810 and the second portion 820. The third portion 870 may include a heat dissipation portion or a member having a heat dissipation characteristic. Descriptions thereof are the same as descriptions given above with reference to FIGS. 4A and 4B, and thus, their detailed descriptions are omitted.

A size of the piezoelectric composite layer PCL may be the same as or different from that of the third portion 870.

For example, a size of the piezoelectric composite layer PCL may be equal to or greater than that of the third portion 870. For example, a size of the third portion 870 may be greater than that of the second portion 820. For example, a size of the first portion 810 and a size of the third portion 870 may be greater than that of the second portion 820. Accordingly, as a size of the first portion 810 and/or a size of the third portion 870 are/is greater or longer than that of the second portion 820, a piezoelectric characteristic and a heat dissipation characteristic may be enhanced.

The vibration generating device 800 may include a first electrode 830 disposed on an upper surface thereof and a second electrode 840 disposed on a lower surface thereof. The vibration generating device 800 may include the first electrode 830 disposed on an upper surface of each of the first portion 810, the second portion 820, and the third portion 830 and the second electrode 840 disposed on a lower surface of each of the first portion 810, the second portion 820, and the third portion 830. The first electrode 830 and the second electrode 840 may be used interchangeably with each other. For example, the first electrode 830 may be disposed on the lower surface of the vibration generating device 800, and the second electrode 840 may be disposed on the upper surface of the vibration generating device 800. The first electrode 830 may be a signal electrode for applying a voltage to the vibration generating device 800. The second electrode 840 may be a ground electrode. For example, the first electrode 830 may be a heat dissipation surface, and the second electrode 840 may be a cooling surface.

According to another embodiment of the present disclosure, the vibration generating device 800 may be a sound generating device which vibrates based on a voice signal synchronized with an image displayed by the display panel 100 to vibrate the display panel 100, thereby generating a sound. As another example, the vibration generating device 800 may be a haptic device which vibrates based on a haptic feedback signal (or a tactile feedback signal) synchronized with a user touch applied to a touch panel (or a touch sensor layer) disposed on the display panel 100 or embedded into the display panel 100 to vibrate the display panel 100. For example, the vibration generating device 800 may be a haptic device which vibrates the display panel 100 to output a feedback based on an action of a user. For example, the vibration generating device 800 may be implemented with one or more of a sound generating device and a haptic device.

Figure 8A:
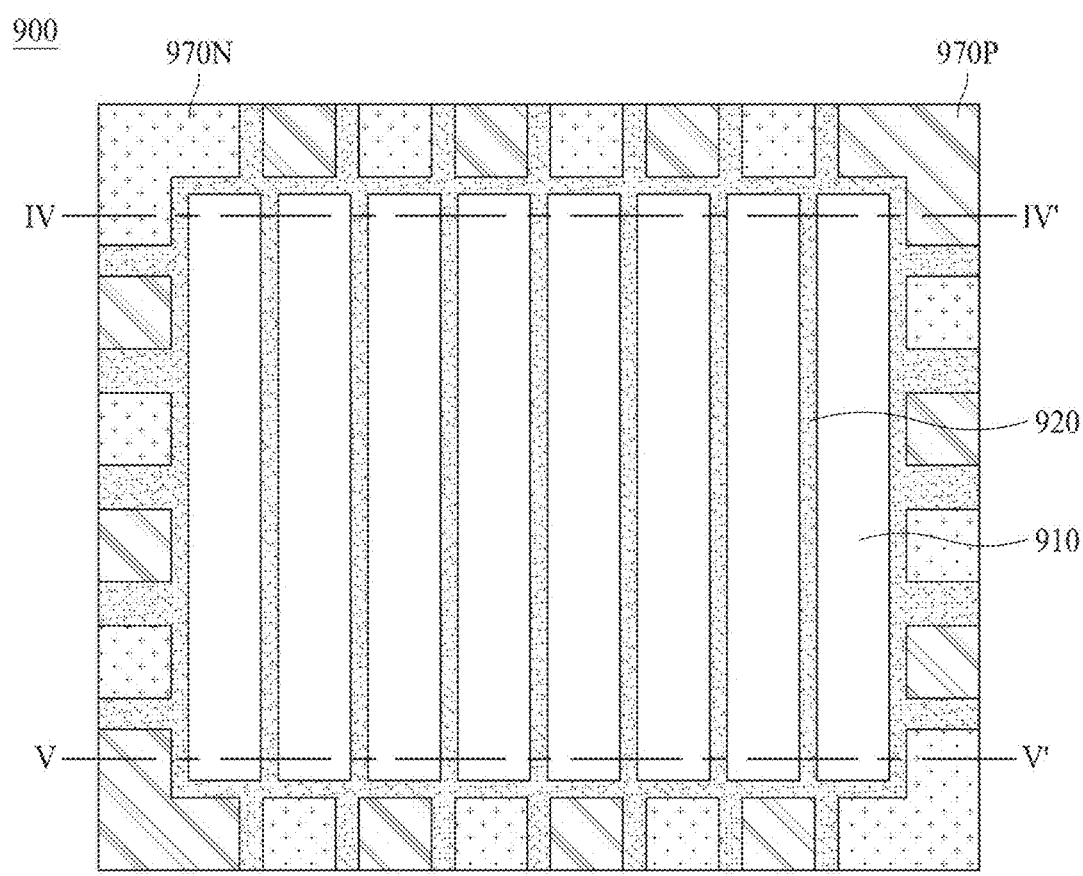
FIG. 8A illustrates a vibration generating device according to another embodiment of the present disclosure.
Figure 8B:
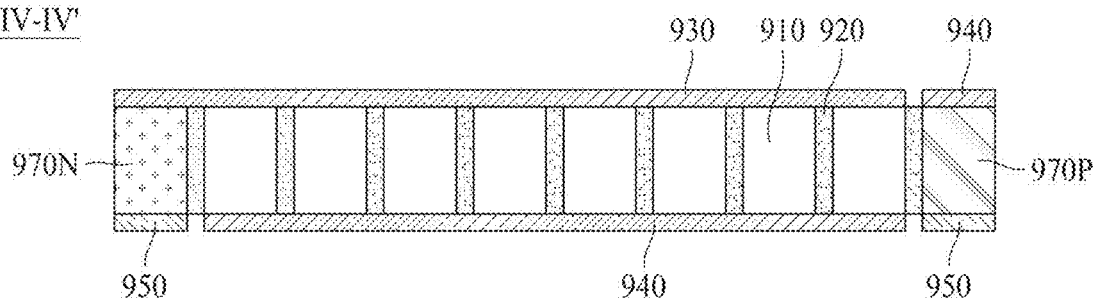
FIG. 8B is a cross-sectional view taken along line IV-IV' illustrated in FIG. 8A.
Figure 8C:
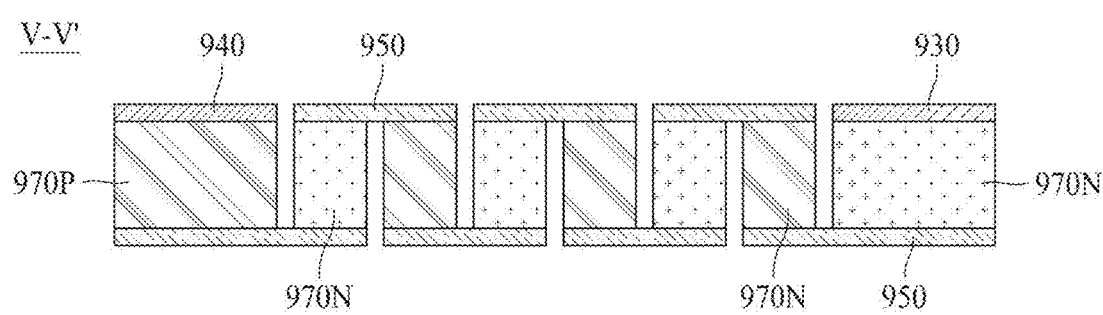
FIG. 8C is a cross-sectional view taken along line V-V' illustrated in FIG. 8A.

FIG. 8A illustrates a vibration generating device according to another embodiment of the present disclosure. FIG. 8B is a cross-sectional view taken along line IV-IV' illustrated in FIG. 8A. FIG. 8C is a cross-sectional view taken along line V-V' illustrated in FIG. 8A.

With reference to FIGS. 8A to 8C, the vibration generating device 900 according to another embodiment of the present disclosure may include a first portion 910, a second portion 920, and a third portion 970.

Descriptions of the first portion 910 and the second portion 920 are the same as descriptions given above with reference to FIGS. 1 to 4B, and thus, their detailed descriptions are omitted.

For example, the first portion 910 may include an inorganic material portion, and the second portion 920 may include an organic material portion. For example, the first portion 910 and the second portion 920 may each include a piezoelectric composite layer PCL. For example, the first portion 910 and the second portion 920 may each be a vibration portion.

The third portion 970 may be disposed near the piezoelectric composite layer PCL. For example, the third portion 970 may be disposed near the second portion 920. For example, the third portion 970 may be disposed near the first portion 910 and the second portion 920. For example, the third portion 970 may be disposed outside the first portion 910 and the second portion 920. For example, the third portion 970 may be disposed to surround the first portion 910 and the second portion 920. For example, the third portion 970 may include a heat dissipation portion or a member having a heat dissipation characteristic. The third portion 970 may be configured with a P-N junction device and may include a P-type device 907P and an N-type device 970N. A size of the piezoelectric composite layer PCL may be the same as or different from that of the third portion 970. For example, a size of the piezoelectric composite layer PCL may be equal to or greater than that of the third portion 970. For example, a size of the third portion 970 may be greater than that of the second portion 920. For example, a size of the first portion 910 and a size of the third portion 970 may be greater than that of the second portion 920. Accordingly, as a size of the first portion 910 and/or a size of the third portion 970 are/is greater or longer than that of the second portion 920, a piezoelectric characteristic and a heat dissipation characteristic may be enhanced.

With reference to FIG. 8B, a first electrode 930 and a second electrode 940 may be respectively disposed on an upper surface and a lower surface of the vibration generating device 900, on which the first portion 910, the second portion 920, and the third portion 970 are disposed. For example, the first electrode 930 may be disposed on an upper surface of each of the first portion 910 and the second portion 920. For example, the second electrode 940 may be disposed on a lower surface of each of the first portion 910 and the second portion 920. The second electrode 940 may be disposed on an upper surface of each of the P-type device 970P and the N-type device 970N. For example, the first electrode 930 and the second electrode 940 may be disposed at a center of the vibration generating device 900. For example, the first electrode 930 may be disposed on the upper surface of the vibration generating device 900, and the second electrode 940 may be disposed on the lower surface of the vibration generating device 900. The first electrode 930 and the second electrode 940 may be used interchangeably with each other. For example, the first electrode 930 may be disposed on the lower surface of the vibration generating device 900, and the second electrode 940 may be disposed on the upper surface of the vibration generating device 900. For example, the first electrode 830 may be a signal electrode for applying a voltage to the vibration generating device 900. The second electrode 940 may be a ground electrode. For example, the first electrode 930 may be a heat dissipation surface, and the second electrode 940 may be a cooling surface. Therefore, the vibration generating device 900 may be placed so that the second electrode 940 which is the cooling surface is disposed on a rear surface of the display panel 100, and thus, an adverse influence of heat caused by a vibration of the vibration generating device 900 may be reduced or minimized on the image quality of the display panel 100.

A 3-$2^{th}$ electrode 950b may be disposed on a lower surface of the N-type device 970N which is the third portion 970 disposed outside the vibration generating device 900. The 3-$2^{th}$ electrode 950b may be disposed on a lower surface of the P-type device 970P which is the third portion 970 disposed outside the vibration generating device 900, and the second electrode 940 may be disposed on an upper surface of the P-type device 970P. With reference to FIG. 8C, a third electrode 950 for connecting a P-N junction device which is the third portion 970 may be disposed under the third portion 970. The third electrode 950 may be a connection electrode, a current path electrode, or a current auxiliary electrode, but the terms are not limited thereto. The third electrode 950 may include a 3-1$^{th}$ electrode 950a and a 3-2$^{th}$ electrode 950b. For example, the third electrode 950 may be an electrode which electrically connects the P-type device 970P to the N-type device 970N. The 3-1$^{th}$ electrode 950a disposed on an upper surface of the P-N junction device 970 may be a heat dissipation surface, and the 3-2$^{th}$ electrode 950b disposed on a lower surface of the P-N junction device 970 may be a cooling surface. Therefore, the vibration generating device 900 may be placed so that the 3-2$^{th}$ electrode 950b which is the cooling surface is disposed on the rear surface of the display panel 100, and thus, an adverse influence of heat caused by a vibration of the vibration generating device 900 may be reduced or minimized on the image quality of the display panel 100.

The second electrode 940 may be disposed on the upper surface of the P-type device 970P which is the third portion 970 disposed at an outermost portion or an outer portion of the vibration generating device 900. The first electrode 930 may be disposed on the upper surface of the N-type device 970N which is the third portion 970 disposed at the outermost portion or the outer portion of the vibration generating device 900.

For example, a P-N junction device may be disposed in zigzags. In this case, comparing with a P-type device or an N-type device, a cooling efficiency may be enhanced.

According to another embodiment of the present disclosure, the vibration generating device 900 may be a sound generating device which vibrates based on a voice signal synchronized with an image displayed by the display panel 100 to vibrate the display panel 100, thereby generating a sound. As another example, the vibration generating device 900 may be a haptic device which vibrates based on a haptic feedback signal (or a tactile feedback signal) synchronized with a user touch applied to a touch panel (or a touch sensor layer) disposed on the display panel 100 or embedded into the display panel 100 to vibrate the display panel 100. For example, the vibration generating device 900 may be a haptic device which vibrates the display panel 100 to output a feedback based on an action of a user. For example, the vibration generating device 900 may be implemented with one or more of a sound generating device and a haptic device.

FIGS. 9A to 9F illustrate a method of manufacturing a vibration generating device according to another embodiment of the present disclosure.

Figure 9A:
FIGS. 9A to 9F illustrate a method of manufacturing a vibration generating device according to another embodiment of the present disclosure.

With reference to FIG. 9A, an inorganic material mother substrate having a piezoelectric characteristic may be manufactured through a pre-process. The inorganic material mother substrate may have a plate shape, but embodiments are not limited thereto. The pre-process according to an embodiment of the present disclosure may mix and dry ceramic raw materials, crystallize a crystalline structure through a firing or sintering process, and may manufacture an inorganic material mother substrate 701 by performing a molding process and a sintering process at least once. The sintering process may use heat, pressure, and spark plasma, but embodiments are not limited thereto. The firing or sintering temperature of the inorganic material mother substrate 901 may be 1,000° C. or more, but embodiments are not limited thereto. For example, when an additive such as a sintering agent is added to the inorganic material mother substrate 901, the firing or sintering temperature of the inorganic material mother substrate 901 may be 1,000° C. or less. The inorganic material mother substrate 901 may be a first portion.

Figure 9B:
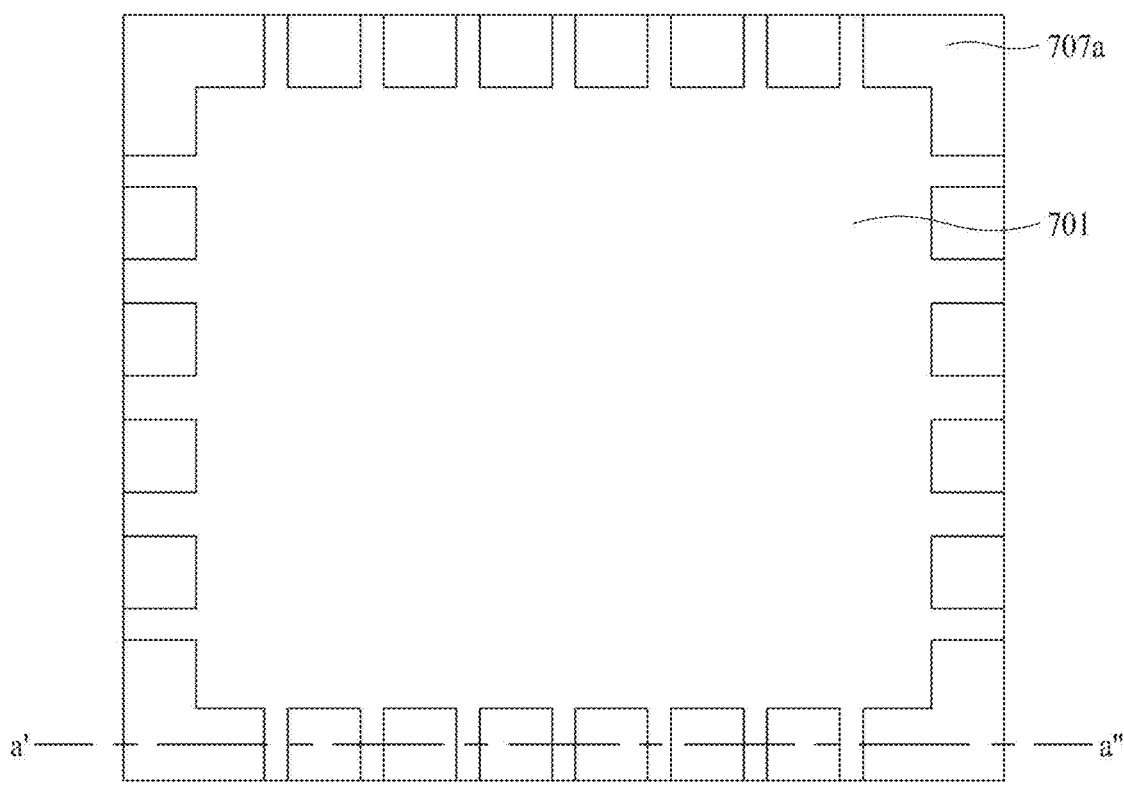
Figure 9B:
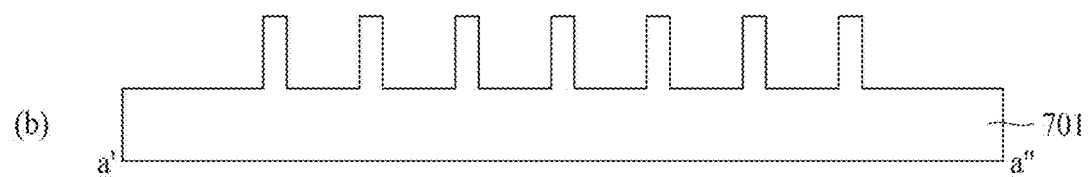
Figure 9C:
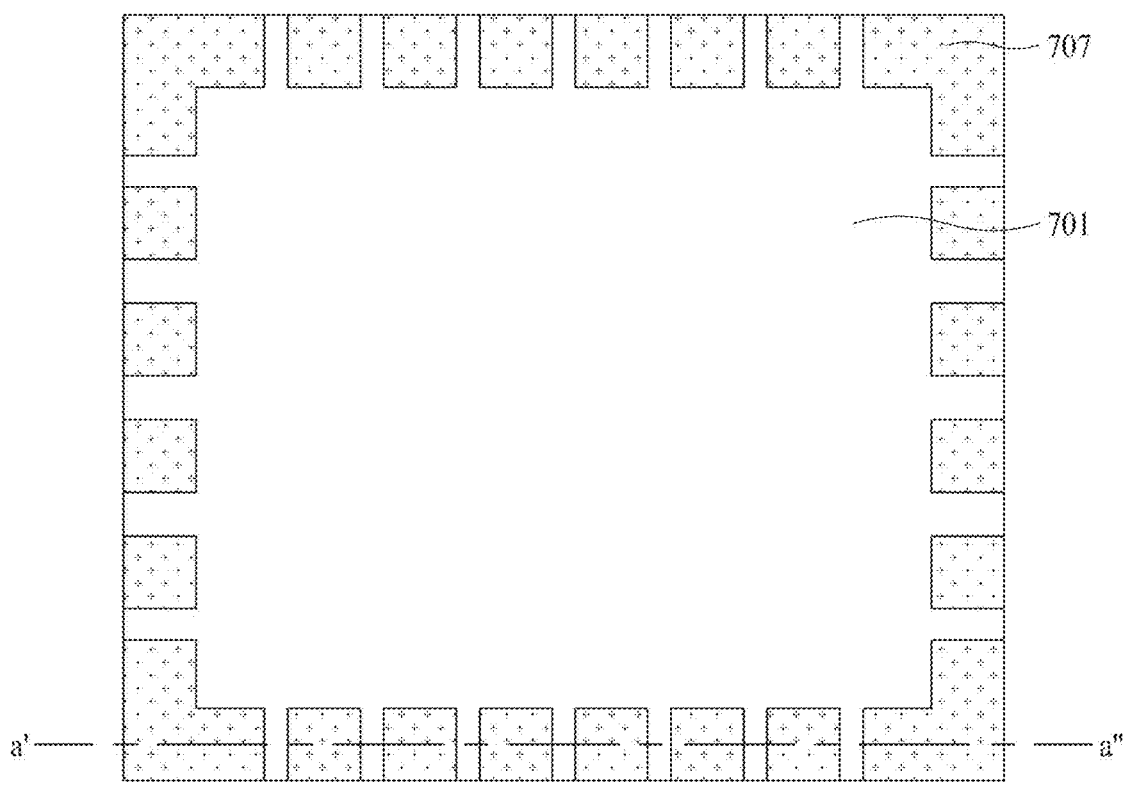
Figure 9C:
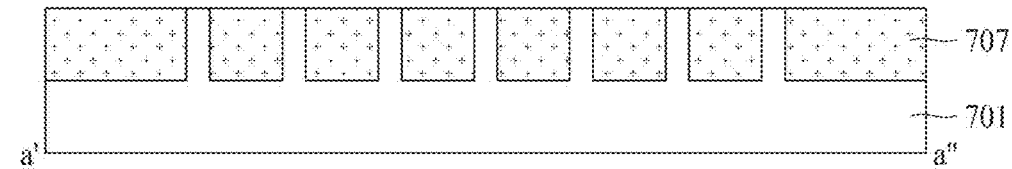

With reference to FIG. 9B, a region 907a filled with a material 907 of a third portion may be formed between adjacent portions of the inorganic material mother substrate 901 by using a process of dicing or sawing the inorganic material mother substrate 901. (b) in FIG. 9B is a view taken along line a'-a" of (a) in FIG. 9B, and it may be seen that a groove or a trench is provided between adjacent portions of the inorganic material mother substrate 901. A material 907 of the third portion may be filled into the region 907a formed in the inorganic material mother substrate 901 (FIG. 9C). (b) in FIG. 9C is a view taken along line a'-a" of (a) in FIG. 9C and is a view illustrating an example where the material 907 of the third portion is filled into a region between adjacent portions of the inorganic material mother substrate 901. The material 907 of the third portion may be solutionized and formed by a screen printing or inkjet printing process, but embodiments are not limited thereto. Subsequently, the material 907 of the third portion may be crystallized or recrystallized through a thermal treatment process. A firing or sintering temperature of the material 907 of the third portion may be about 500° C., but embodiments are not limited thereto. The material 907 of the third portion may be the third portion.

Figure 9D:
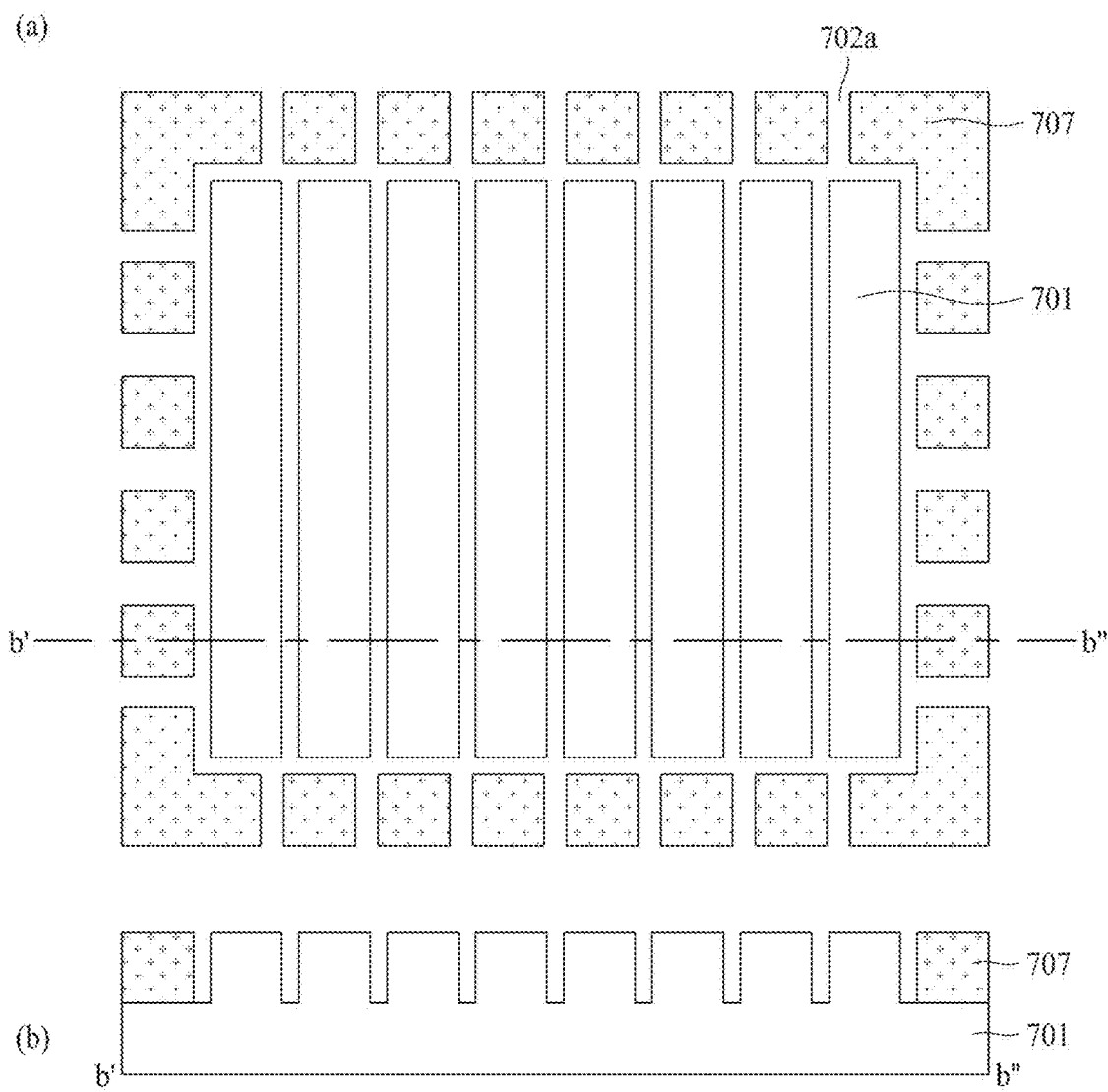

Moreover, a groove or trench 902a may be formed between the material 907 of the third portion and the inorganic material mother substrate 901 by using an etching process (FIG. 9D). (b) in FIG. 9D is a view taken along line b'-b" of (a) in FIG. 9D and is a view illustrating an example where the groove or trench 902a is formed between the material 907 of the third portion and the inorganic material mother substrate 901.

Figure 9E:
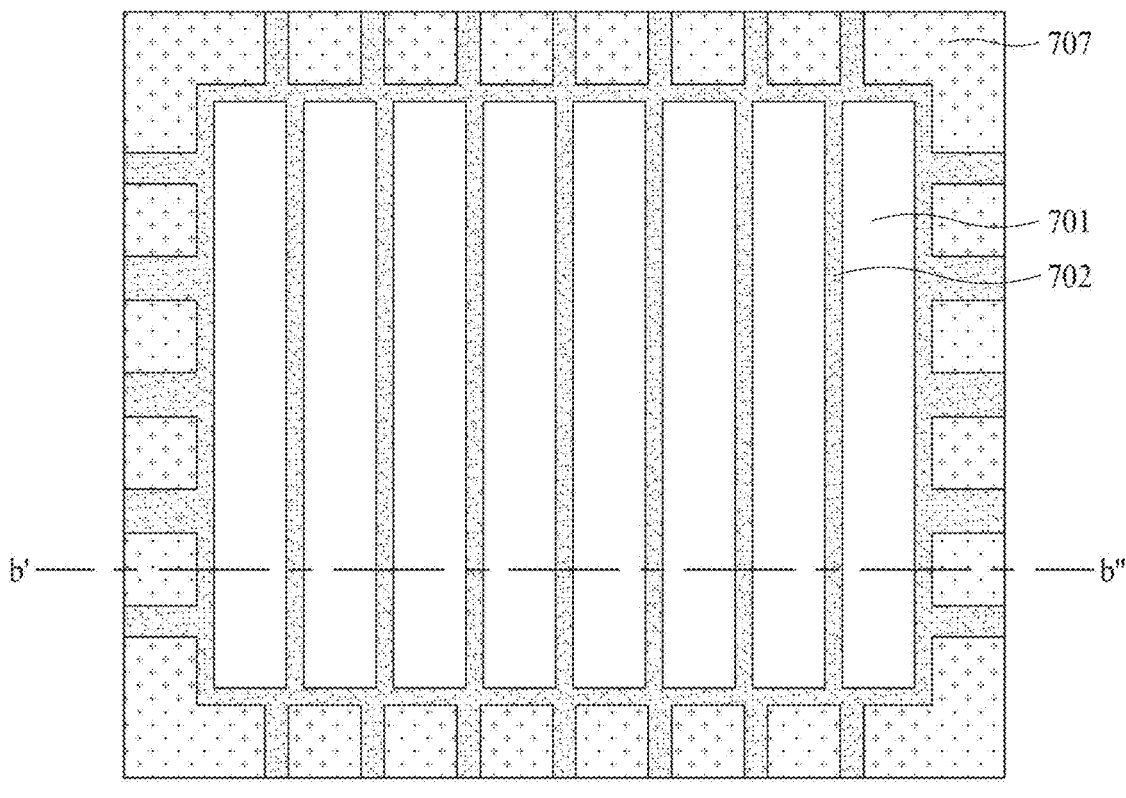
Figure 9E:
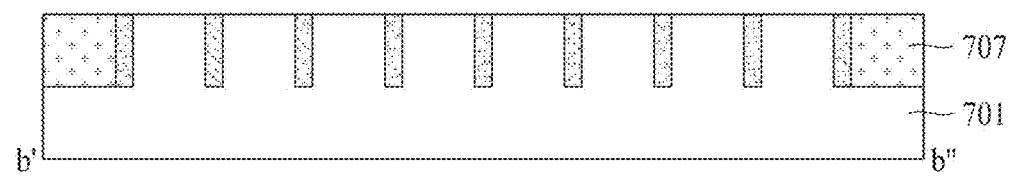

A material 902 of a second portion may be filled into the groove or trench 902a (FIG. 9E). (b) in FIG. 9E is a view taken along line b'-b" of (a) in FIG. 9E and is a view illustrating an example where the material 907 of the third portion is filled into a region between adjacent portions of the inorganic material mother substrate 901. The material 902 of the second portion may be cured through a thermal treatment process. For example, the thermal treatment process may be performed as a process such as thermal curing, natural curing, and ultraviolet (UV) curing, but embodiments are not limited thereto. The material 902 of the second portion may be the second portion.

Figure 9F:
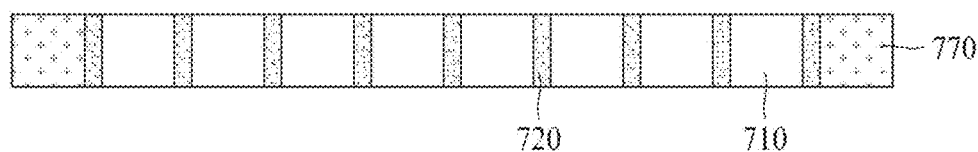

As in FIG. 9F, the first portion 910, the second portion 920, and the third portion 970 of the vibration generating device may be formed by a process such as a lapping process or a cutting process. For example, the cutting process may be performed by at least one of a wire sawing process, a scribing process, a blade dicing process, a stealth dicing process, and a thermal laser separation (TLS) process, but embodiments are not limited thereto.

For example, when the first portion 910 is formed, the second portion 920 is formed, and the third portion 990 is formed, the second portion 920 may be damaged due to a firing or sintering temperature difference between the second portion 920 and the third portion 990. For example, when the third portion 990 is formed, the first portion 910 is formed, and the second portion 920 is formed, the second portion 920 and the third portion 990 may be damaged due to a firing or sintering temperature difference between the third portion 990 and the first portion 910 and a firing or sintering temperature difference between the first portion 910 and the second portion 920. Therefore, when the first portion 910 is formed, the third portion 990 is formed, and the second portion 920 is formed, for preventing the damages of the first to third portions 910, 920, and 990, the damages of the first to third portions 910, 920, and 990 may be prevented based on a firing or sintering temperature difference between the first portion 910 and the third portion 990 and a firing or sintering temperature difference between the second portion 920 and the third portion 990.

Figure 10:
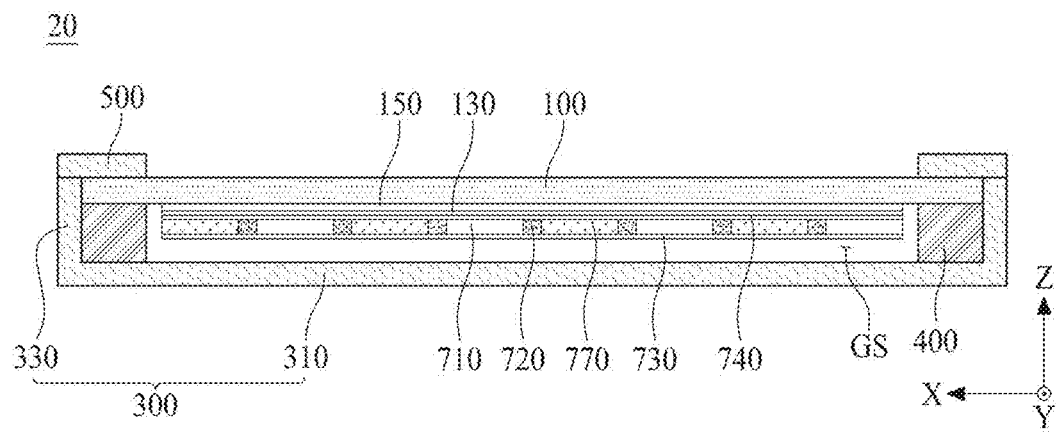
FIG. 10 illustrates a display apparatus according to another embodiment of the present disclosure.

FIG. 10 illustrates a display apparatus according to another embodiment of the present disclosure.

With reference to FIG. 10, the display apparatus 20 according to another embodiment of the present disclosure may include a display panel 100 and a vibration generating device 700 disposed on a rear surface of the display panel 100. The vibration generating device 700 may be configured as one of the vibration generating devices of FIGS. 4, 7, and 8. In the following embodiments, for example, the vibration generating device of FIG. 4 will be described.

The vibration generating device 700 may include a first portion 710, a second portion 720, and a third portion 770. Descriptions thereof are the same as descriptions given above with reference to FIG. 4, and thus, their detailed descriptions are omitted.

The vibration generating device 700 may be disposed on a rear surface of the display panel 100 by an adhesive member 150.

A heat dissipation plate 130 may be further disposed between the display panel 100 and the vibration generating device 700. For example, the heat dissipation plate 130 may be disposed on the rear surface of the display panel 100 by the adhesive member 150.

The heat dissipation plate 130 may reduce or decrease heat which occurs due to a vibration of the vibration generating device 700. The heat dissipation plate 130 may be configured to cover the vibration generating device 700 or to have a size which is greater than that of the vibration generating device 700. The heat dissipation plate 130 may have a polygonal plate shape or a circular plate shape having a certain thickness, but embodiments are not limited thereto. For example, the heat dissipation plate 130 may include a metal material, having high heat conductivity, such as aluminum (Al), copper (Cu), or silver (Ag) or an alloy thereof, but embodiments are not limited thereto. The heat dissipation plate 130 may be a heat dissipation member, a heat dissipation sheet, a heat dissipation tape, or a heat dissipation pad, but the terms are not limited thereto. Accordingly, since the heat dissipation plate 130 is provided, an adverse influence of heat caused by a vibration of the vibration generating device 700 may be reduced on the image quality of the display panel 100.

The heat dissipation plate 130 may be disposed in the vibration generating device 700 using an adhesive member. The adhesive member may include a double-sided tape, a single-sided tape, an adhesive, and a bond, but embodiments are not limited. As another example, the adhesive member may include the same material as that of the adhesive member 150 disposed on the rear surface of the display panel 100, but is not limited thereto. For example, the adhesive layer of the adhesive member 150 may include epoxy, acryl, silicon, urethane, or paraffin wax, but embodiments are not limited thereto. The adhesive layer of the adhesive member 150 may further include an additive such as a tackifier, a wax component, or an anti-oxidation agent, and the additive may prevent the adhesive member 150 from being detached (stripped) from the display panel 100 by a vibration of the vibration generating device 200. For example, the tackifier may be rosin derivative or the like, the wax component may be paraffin wax or the like, but embodiments are not limited thereto. For example, the anti-oxidation agent may be a phenol-based anti-oxidation agent, and for example, may be thioester, but embodiments are not limited thereto.

The vibration generating device 700 may be disposed so that the second electrode 740 is closer to the heat dissipation plate 130 than the first electrode 730. For example, the second electrode 740 which is a ground electrode may be disposed closer to the heat dissipation plate 130 than the first electrode 730 which is a signal electrode. For example, the second electrode 740 which is a cooling surface may be disposed on the heat dissipation plate 130, and thus, an adverse influence of heat caused by a vibration of the vibration generating device 700 may be reduced or minimized on the image quality of the display panel 100. Accordingly, since the heat dissipation plate 130 and the vibration generating device 700 having a heat dissipation characteristic are provided and a cooling surface of the vibration generating device 700 is disposed adjacent to the heat dissipation plate, an adverse influence of heat caused by a vibration of the vibration generating device 700 may be reduced or minimized on the image quality of the display panel 100, and a lifetime of the display apparatus 20 may be enhanced.

Figure 11:
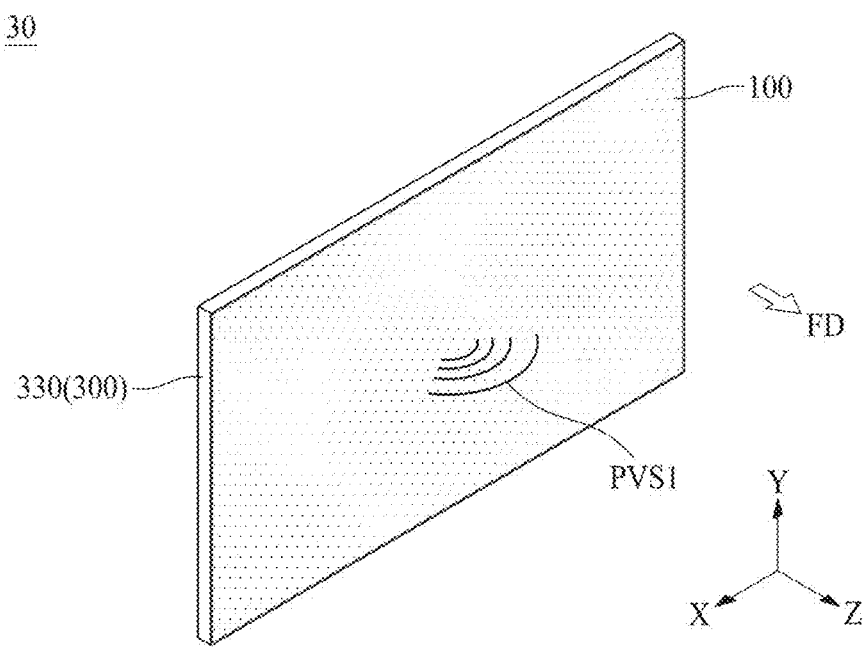
FIG. 11 illustrates a display apparatus including a vibration generating device according to another embodiment of the present disclosure.
Figure 12A:
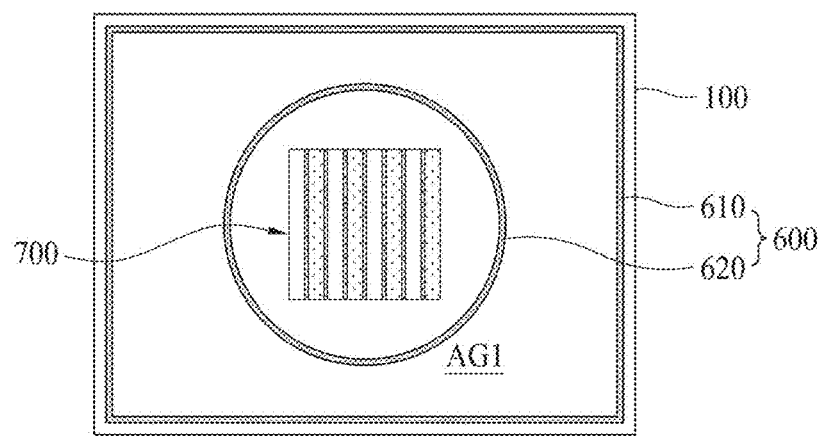
FIGS. 12A and 12B illustrate a vibration generating device according to another embodiment of the present disclosure.
Figure 12B:
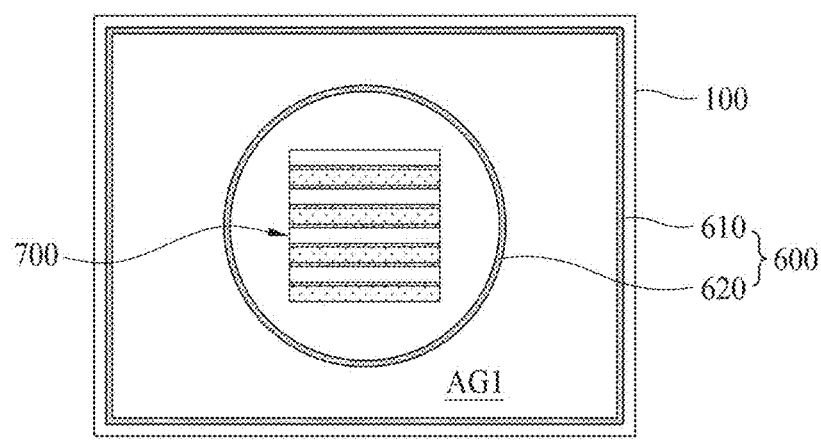

FIG. 11 illustrates a display apparatus including a vibration generating device according to another embodiment of the present disclosure. FIGS. 12A and 12B illustrate a vibration generating device according to another embodiment of the present disclosure.

With reference to FIGS. 11 to 12B, a vibration generating device according to another embodiment of the present disclosure may include a first portion, a second portion, and a third portion. The vibration generating device may be configured as one of the vibration generating devices of FIGS. 4, 7, and 8. In the following embodiments, for example, the vibration generating device of FIG. 4 will be described.

The vibration generating device 700 may further include a first electrode disposed on a first surface of the vibration generating device 700 and a second electrode disposed on a second surface opposite to the first surface of the vibration generating device 700. Also, the vibration generating device 700 may further include a first passivation layer covering the first electrode and a second passivation layer covering the second electrode. When the vibration generating device of FIG. 8 is applied, the vibration generating device 700 may further include a third electrode. The first electrode, the second electrode, the third electrode, the first passivation layer, and the second passivation layer are the same as descriptions given above, and thus, their repetitive descriptions are omitted. In descriptions given below with reference to FIGS. 13A to 17B, the same descriptions may be applied.

A display apparatus 30 according to an embodiment of the present disclosure may further include a partition 600 near the display panel 100. The partition 600 may be an air gap or a space where a sound is generated when the display panel 100 is vibrated by the vibration generating device 700. An air gap or a space which generates or transfers a sound may be referred to as a partition. A partition may be referred to as an enclosure or a baffle, but the term is not limited thereto.

For example, the partition 600 may include a first partition 610. The first partition 610 may be disposed between the display panel 100 and a supporting member 300.

For example, the first partition 610 may be disposed along a region between a rear periphery of the display panel 100 and a front periphery of the supporting member 300. The first partition 610 may be referred to as an edge partition, a periphery partition, a sound blocking member, an edge enclosure, a periphery enclosure, or a baffle, but the terms are not limited thereto. For example, the first partition 610 may be disposed to contact or to be adjacent to the connection member 400 illustrated in FIG. 2. As another example, the first partition 610 may be implemented as one body with the connection member 400.

For example, the partition 600 may include a second partition 620. The second partition 620 may surround the vibration generating device 700. The second partition 620 according to an embodiment of the present disclosure may have a circular shape which surrounds the vibration generating device 700, but embodiments are not limited thereto. For example, the second partition 620 may have a shape which is the same as or different from a whole shape. For example, when the vibration generating device 700 has a rectangular (e.g., tetragonal or square) shape, the second partition 620 may have a rectangular (e.g., tetragonal or square) shape having a size which is relatively greater than that of the vibration generating device 700.

The second partition 620 may limit (or define) a vibration region (or a vibration area) of the display panel 100 performed by the vibration generating device 700. For example, in the display panel 100, as a size of the second partition 620 increases, a vibration region of the display panel 100 may increase, and thus, a characteristic of a low-pitched sound band may be enhanced. On the other hand, in the display panel 100, as a size of the second partition 620 decreases, a vibration region of the display panel 100 may decrease, and thus, a characteristic of a high-pitched sound band may be enhanced. Therefore, a size of the second partition 620 may be set based on a characteristic of a sound band based on a vibration of the display panel 100. For example, a frequency of the low-pitched sound band may be 200 Hz or less, a frequency of a middle-pitched sound band may be 200 Hz to 3 kHz, and a frequency of the high-pitched sound band may be 3 kHz. However, embodiments are not limited thereto.

For example, the partition 600 may include polyurethane, polyolefin, and/or the like, but embodiments are not limited thereto. As another example, the partition 600 may include a single-sided tape, a double-sided tape, a single-sided foam pad, a double-sided foam pad, a single-sided foam tape, and/or a double-sided foam tape, and for example, may include a material having an elastic force which enables compression to be made to a certain degree.

The first partition 610 may provide a first air gap AG1 between the display panel 100 and the supporting member 300 along with the second partition 620. For example, the first air gap AG1 may be referred to as a vibration space, a sound pressure space, a sound box, a sound part, a resonance box, or a resonance part, but the term is not limited thereto.

The first air gap AG1 may be provided in a region of the display panel 100 surrounded by the second partition 620 disposed in the display panel 100 and the first partition 610 disposed in the display panel 100.

Therefore, the display apparatus 30 according to an embodiment of the present disclosure may include the partition 600, and thus, may optimize a reproduction sound band. For example, the display apparatus 30 according to an embodiment of the present disclosure may include at least one of the first and second partitions 610 and 620.

With reference to FIG. 12A, a vibration generating device 700 may be implemented with a first portion 710, a second portion 720, and a third portion 770, which are arranged in a lengthwise direction. In a case which is disposed in a lengthwise direction, the vibration generating device 700 may be applied to a rollable display apparatus which is rollable in a horizontal direction of a display panel.

As another example, as illustrated in FIG. 12B, a vibration generating device 700 may be implemented with a first portion 710, a second portion 720, and a third portion 770, which are arranged in a widthwise direction. In a case which is disposed in a lengthwise direction, the vibration generating device 700 may be applied to a rollable display apparatus which is rollable in a vertical direction of a display panel.

Figure 13A:
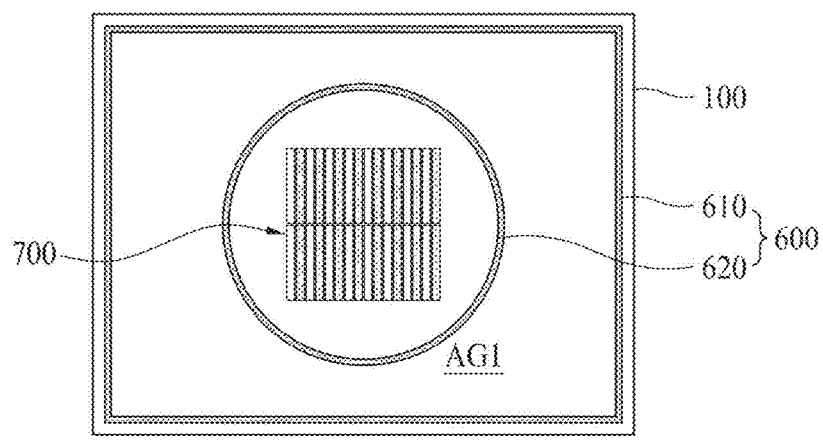
FIGS. 13A and 13B illustrate a display apparatus including a vibration generating device according to another embodiment of the present disclosure.
Figure 13B:
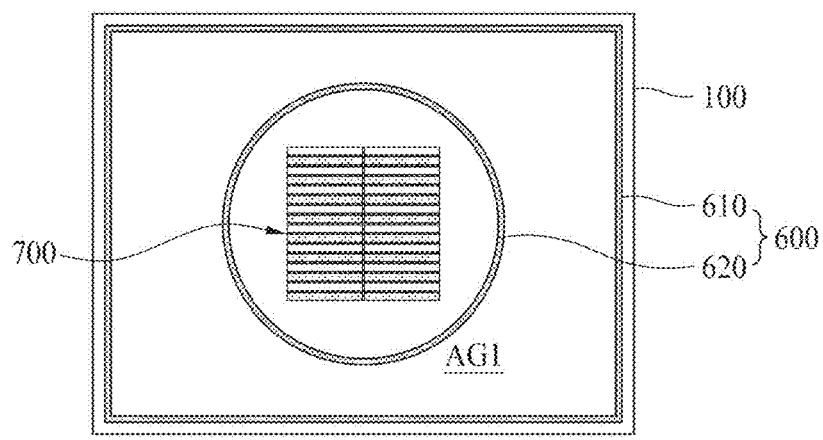

FIGS. 13A and 13B are diagrams illustrating a display apparatus including a vibration generating device according to another embodiment of the present disclosure.

With reference to FIGS. 13A and 13B, a vibration generating device according to another embodiment of the present disclosure may include a first portion, a second portion, and a third portion and may be configured as one of the vibration generating devices of FIGS. 4, 7, and 8.

A plurality of first portions 710 according to an embodiment of the present disclosure may be arranged apart from one another in a first direction X and a second direction Y to have a tetragonal shape (or a square shape). The plurality of first portions 710 may be disposed adjacent to one another to have a tetragonal shape (or a square shape).

Each of a plurality of second portions 720 may be disposed or provided between two adjacent first portions 710 of the plurality of first portions 710. For example, each of a plurality of third portions 770 may be disposed or provided between two adjacent second portions 720 of the plurality of second portions 720. For example, each of the third portions 770 may have a +-shape which is disposed between two second portions 720 of four second portions 720 forming a tetragonal (e.g., rectangular) shape (or a square shape).

The vibration generating device 700 may further include a first electrode disposed on a first surface of the vibration generating device 700 and a second electrode disposed on a second surface opposite to the first surface of the vibration generating device 700. Also, the vibration generating device 700 may further include a first passivation layer covering the first electrode and a second passivation layer covering the second electrode. When the vibration generating device of FIG. 8 is applied, the vibration generating device 700 may further include a third electrode. The first electrode, the second electrode, the third electrode, the first passivation layer, and the second passivation layer are the same as descriptions given above, and thus, their repetitive descriptions are omitted.

A display apparatus according to an embodiment of the present disclosure may further include a partition 600 between a display panel 100 and a supporting member 300. The partition 600 is the same as the partition 600 described above with reference to FIG. 12, and thus, its repetitive description is omitted.

With reference to FIG. 13A, a vibration generating device 700 may be implemented with a first portion 710, a second portion 720, and a third portion 770, which are arranged in a lengthwise direction. In a case which is disposed in a lengthwise direction, the vibration generating device 700 may be applied to a rollable display apparatus which is rollable in a horizontal direction of a display panel.

As another example, as illustrated in FIG. 13B, a vibration generating device 700 may be implemented with a first portion 710, a second portion 720, and a third portion 770, which are arranged in a widthwise direction. In a case which is disposed in a lengthwise direction, the vibration generating device 700 may be applied to a rollable display apparatus which is rollable in a vertical direction of a display panel.

Therefore, the display apparatus according to an embodiment of the present disclosure may output a sound through the vibration generating device 700 to provide a sound to a user. Also, the display apparatus according to an embodiment of the present disclosure may provide a vibration through the vibration generating device 700, thereby providing a haptic feedback to a user. Also, the display apparatus according to an embodiment of the present disclosure may include the partition 600, thereby more enhancing a sound characteristic.

Figure 14A:
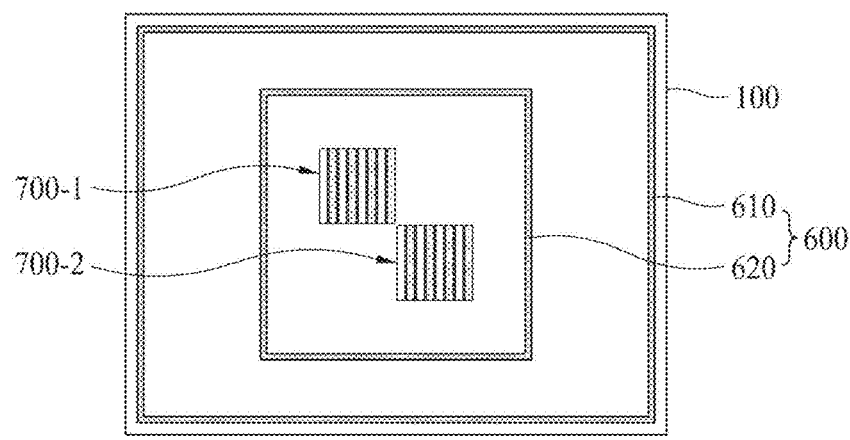
FIGS. 14A and 14B illustrate a display apparatus including a vibration generating device according to another embodiment of the present disclosure.
Figure 14B:
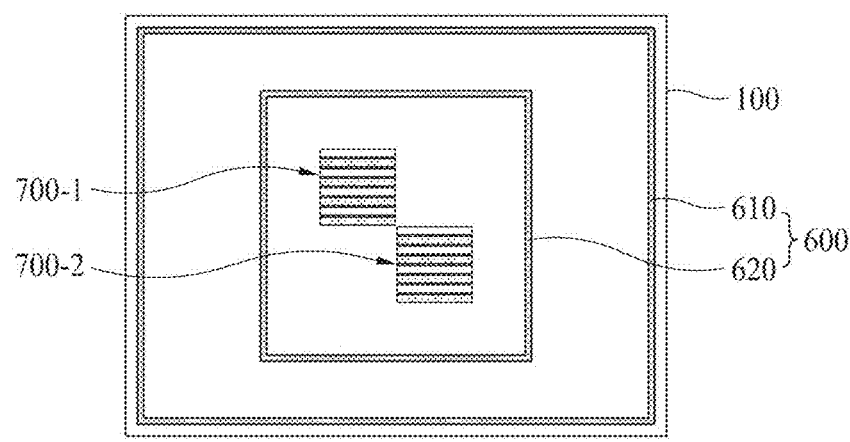

FIGS. 14A and 14B illustrate a display apparatus including a vibration generating device according to another embodiment of the present disclosure.

With reference to FIGS. 14A and 14B, the vibration generating device may include a first vibration generating device 700-1 and a second vibration generating device 700-2, which are disposed on a rear surface of a display panel 100. FIG. 14A illustrates an embodiment where a vibration generating device 700 is disposed in a lengthwise direction, and FIG. 14B illustrates an embodiment where a vibration generating device 700 is disposed in a widthwise direction. Descriptions thereof are the same as descriptions given above with reference to FIGS. 12B and 12C, and thus, their detailed descriptions are omitted. The vibration generating device may include a first portion, a second portion, and a third portion and may be configured as one of the vibration generating devices of FIGS. 4, 7, and 8. Descriptions of partitions are the same as descriptions given above with reference to FIGS. 12A to 12C, and thus, their detailed descriptions are omitted.

The first vibration generating device 700-1 and the second vibration generating device 700-2 may be staggeredly or diagonally disposed in the display panel 100, and thus, may increase a vibration area of the display panel 100. For example, in addition to the first vibration generating device 700-1, the second vibration generating device 700-2 may be further provided, and thus, a vibration sound PVS1 and/or a haptic feedback may be more enhanced. The first vibration generating device 700-1 and the second vibration generating device 700-2 may vibrate the display panel 100, and thus, the display panel 100 may generate the vibration sound PVS1 or may generate the haptic feedback. For example, a vibration area of the display panel 100 may increase based on a diagonal arrangement structure of the first vibration generating device 700-1 and the second vibration generating device 700-2, thereby enhancing a characteristic of the low-pitched sound band. The diagonal arrangement structure of the first vibration generating device 700-1 and the second vibration generating device 700-2 may have an effect which enables vibration generating devices to be arranged in a 2×2 structure in the display panel 100, thereby decreasing the number of vibration generating devices, vibrating the display panel 100, by half.

Figure 15A:
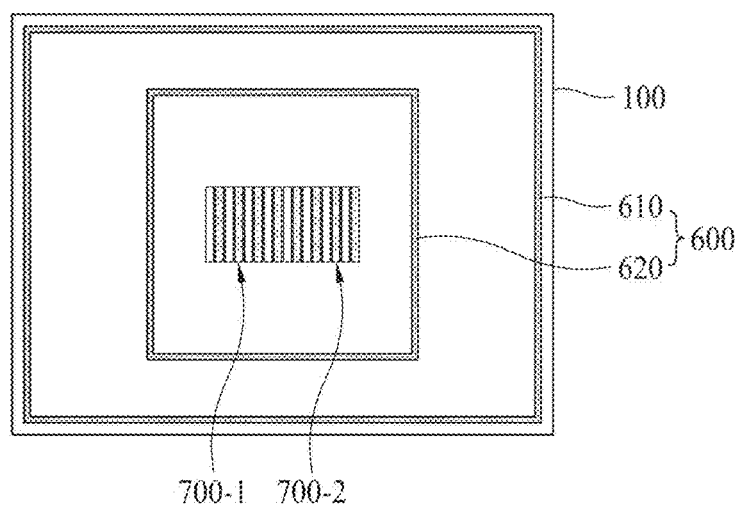
FIGS. 15A and 15B illustrate a display apparatus including a vibration generating device according to another embodiment of the present disclosure.
Figure 15B:
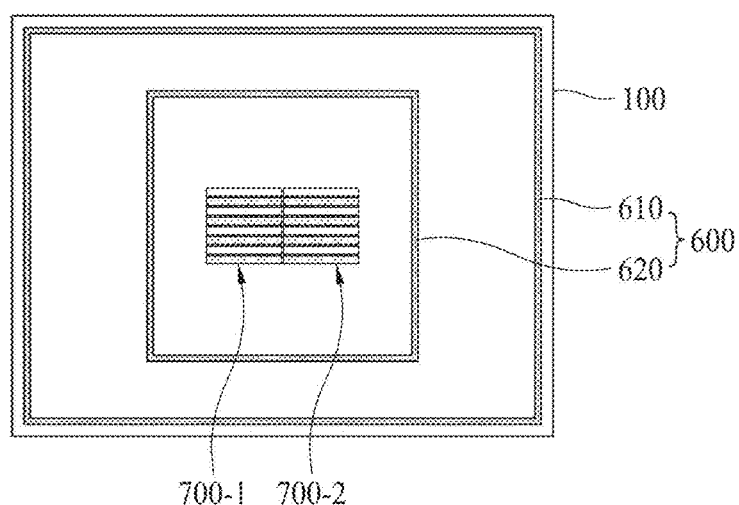

FIGS. 15A and 15B illustrate a display apparatus including a vibration generating device according to another embodiment of the present disclosure.

With reference to FIGS. 15A and 15B, the vibration generating device may include a first vibration generating device 700-1 and a second vibration generating device 700-2, which are disposed on a rear surface of a display panel 100. FIG. 15A is a diagram illustrating an example where a vibration generating device 700 is disposed in a lengthwise direction, and FIG. 15B is a diagram illustrating an example where a vibration generating device 700 is disposed in a widthwise direction. Descriptions thereof are the same as descriptions given above with reference to FIGS. 12B and 12C, and thus, their detailed descriptions are omitted. The vibration generating device may include a first portion, a second portion, and a third portion and may be configured as one of the vibration generating devices of FIGS. 4, 7, and 8. Descriptions of partitions are the same as descriptions given above with reference to FIGS. 12A to 12C, and thus, their detailed descriptions are omitted.

The first vibration generating device 700-1 and the second vibration generating device 700-2 may be disposed in parallel in a first direction X or a second direction Y in the display panel 100. A vibration area of the display panel 100 may increase based on a parallel arrangement structure of the first vibration generating device 700-1 and the second vibration generating device 700-2, thereby enhancing a characteristic of the low-pitched sound band.

Figure 16A:
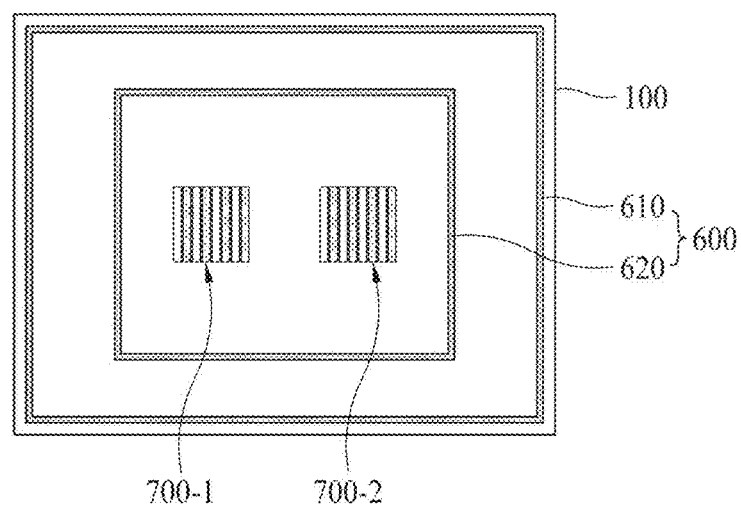
FIGS. 16A and 16B illustrate a display apparatus including a vibration generating device according to another embodiment of the present disclosure.
Figure 16B:
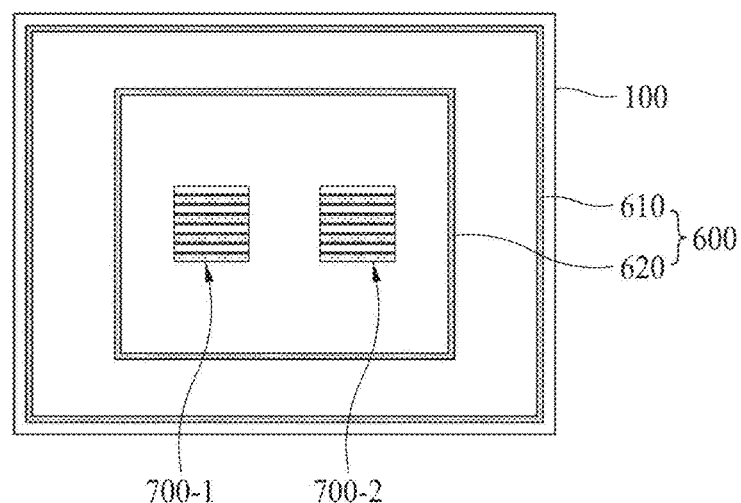

FIGS. 16A and 16B illustrate a display apparatus including a vibration generating device according to another embodiment of the present disclosure.

With reference to FIGS. 16A and 16B, the vibration generating device may include a first vibration generating device 700-1 and a second vibration generating device 700-2, which are disposed on a rear surface of a display panel 100. FIG. 16A illustrates an example where a vibration generating device 700 is disposed in a lengthwise direction, and FIG. 16B illustrates an example where a vibration generating device 700 is disposed in a widthwise direction. Descriptions thereof are the same as descriptions given above with reference to FIGS. 12B and 12C, and thus, their detailed descriptions are omitted. The vibration generating device may include a first portion, a second portion, and a third portion and may be configured as one of the vibration generating devices of FIGS. 4, 7, and 8. Descriptions of partitions are the same as descriptions given above with reference to FIGS. 12A to 12C, and thus, their detailed descriptions are omitted.

The first vibration generating device 700-1 and the second vibration generating device 700-2 may be disposed apart from each other in a first direction X or a second direction Y in the display panel 100. Because the first vibration generating device 700-1 and the second vibration generating device 700-2 are disposed apart from each other, a vibration area of the display panel 100 may increase. For example, in addition to the first vibration generating device 700-1, the second vibration generating device 700-2 may be further provided, and thus, a vibration sound PVS1 and/or a haptic feedback may be more enhanced. Therefore, since the first vibration generating device 700-1 and the second vibration generating device 700-2 are disposed apart from each other, a left sound and a right sound may be divisionally output, thereby providing a user with a stereo sound or a haptic feedback.

As another example, in the display apparatus 30, the vibration generating device 700 may be disposed in a region where a heating temperature is high. For example, when the vibration generating device 700 is disposed at a lower portion with respect to a center of the display apparatus 30, heat of the display apparatus 30 may be cooled, thereby better preventing the display panel 100 from being degraded by heat of a light emitting device layer included in the display panel 100. For example, when the vibration generating device 700 is disposed closer to a heat source which causes the occurrence of heat in a source printed circuit board (PCB) or a control board where a driving circuit and the like for driving the display panel and the vibration generating device are disposed, heat of the display apparatus 30 may be cooled, thereby better preventing the display panel 100 from being degraded by heat of a light emitting device layer included in the display panel 100.

As another example, in an image where the vibration generating device 700 is not driven as a sound generating device, heat occurring in the display panel may be obtained as power by using Seebeck effect of a third portion, and thus, the consumption of a driving power of the vibration generating device 700 may be reduced.

As another example, when the vibration generating device 700 is implemented as a sound generating device, in an operation of lowering a volume of a sound, all of the first vibration generating device 700-1 and the second vibration generating device 700-2 may not be driven, and one of the first vibration generating device 700-1 and the second vibration generating device 700-2 may be driven. Therefore, energy may be generated based on a vibration of one of the first vibration generating device 700-1 and the second vibration generating device 700-2, and the generated energy may be used for vibrating one of the first vibration generating device 700-1 and the second vibration generating device 700-2, thereby realizing energy harvesting.

As another example, when the vibration generating device 700 is implemented as a haptic device, the vibration generating device 700 may be driven, and when the vibration generating device 700 is not implemented as a haptic device, the vibration generating device 700 may not be driven. In this case, the first vibration generating device 700-1 of the vibration generating device 700 may be implemented as a cooling device, and the second vibration generating device 700-2 may be implemented as a harvesting device, thereby reducing power consumption.

Figure 17A:
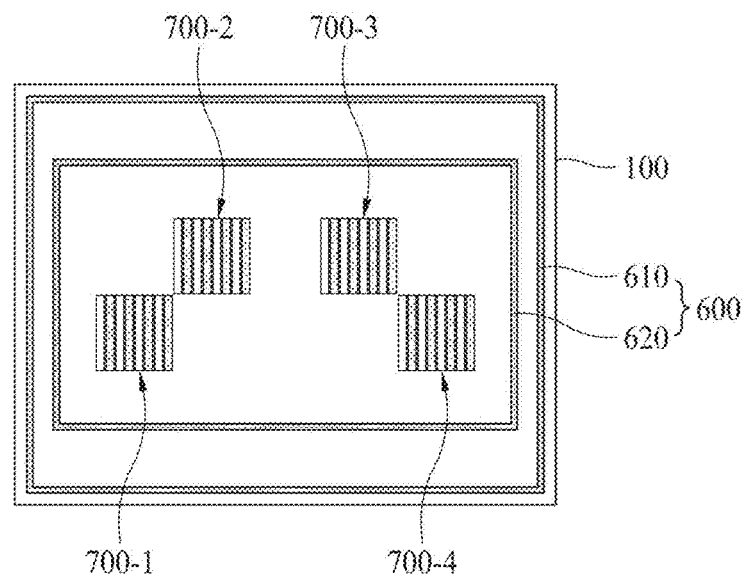
FIGS. 17A and 17B illustrate a display apparatus including a vibration generating device according to another embodiment of the present disclosure.
Figure 17B:
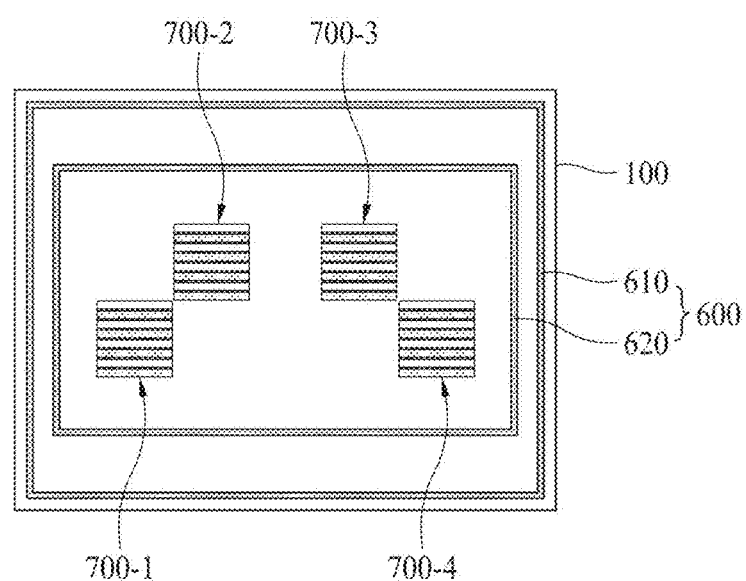

FIGS. 17A and 17B illustrate a display apparatus including a vibration generating device according to another embodiment of the present disclosure.

With reference to FIGS. 17A and 17B, the vibration generating device may include first to fourth vibration generating devices 700-1 to 700-4, which are disposed on a rear surface of a display panel 100. FIG. 17A is a diagram illustrating an example where a vibration generating device 700 is disposed in a lengthwise direction, and FIG. 17B is a diagram illustrating an example where a vibration generating device 700 is disposed in a widthwise direction. Descriptions thereof are the same as descriptions given above with reference to FIGS. 12B and 12C, and thus, their detailed descriptions are omitted. The vibration generating device may include a first portion, a second portion, and a third portion and may be configured as one of the vibration generating devices of FIGS. 4, 7, and 8. Descriptions of partitions are the same as descriptions given above with reference to FIGS. 12A to 12C, and thus, their detailed descriptions are omitted.

The first vibration generating device 700-1 may be disposed in a left region of the display panel 100, and the fourth vibration generating device 700-4 may be disposed in a right region of the display panel 100. The second vibration generating device 700-2 and the third vibration generating device 700-3 may be disposed in a center region of the display panel 100. For example, the second vibration generating device 700-2 and the third vibration generating device 700-3 may be disposed between the first vibration generating device 700-1 and the fourth vibration generating device 700-4.

The first to fourth vibration generating devices 700-1 to 700-4 may be disposed apart from one another in a first direction X or a second direction Y in the display panel 100. For example, the first vibration generating device 700-1 may be disposed apart from the second vibration generating device 700-2 and the third vibration generating device 700-3. For example, the fourth vibration generating device 700-4 may be disposed apart from the second vibration generating device 700-2 and the third vibration generating device 700-3. For example, the second vibration generating device 700-2 may be disposed apart from the third vibration generating device 700-3. Since the first to fourth vibration generating devices 700-1 to 700-4 are disposed apart from one another, a vibration area of the display panel 100 may increase. For example, in addition to the first vibration generating device 700-1, the second to fourth vibration generating devices 700-2 to 700-4 may be further provided, and thus, a vibration sound PVS1 and/or a haptic feedback may be more enhanced. Therefore, since the first to fourth vibration generating devices 700-1 to 700-4 are disposed apart from one another, a left sound and a right sound may be divisionally output, thereby providing a user with a stereo sound or a haptic feedback.

As another example, in the display apparatus 30, the vibration generating device 700 may be disposed in a region where a heating temperature is high. For example, when the vibration generating device 700 is disposed at a lower portion with respect to a center of the display apparatus 30, heat of the display apparatus 30 may be cooled, thereby preventing the display panel 100 from being degraded by heat of a light emitting device layer included in the display panel 100.

As another example, in an image where the vibration generating device 700 is not driven as a sound generating device, heat occurring in the display panel may be obtained as power by using Seebeck effect of a third portion, and thus, the consumption of a driving power of the vibration generating device 700 may be reduced.

As another example, when the vibration generating device 700 is implemented as a sound generating device, in an operation of lowering a volume of a sound, all of the first to fourth vibration generating devices 700-1 to 700-4 may not be driven, and one of the first vibration generating device 700-1 and the fourth vibration generating device 700-4 may be driven or one of the second vibration generating device 700-2 and the third vibration generating device 700-3 may be driven. Therefore, energy may be generated based on a vibration of one of the first vibration generating device 700-1 and the fourth vibration generating device 700-4, and the generated energy may be used for vibrating one of the second vibration generating device 700-2 and the third vibration generating device 700-3, thereby realizing energy harvesting.

As another example, when the vibration generating device 700 is implemented as a haptic device, the vibration generating device 700 may be driven, and when the vibration generating device 700 is not implemented as a haptic device, the vibration generating device 700 may not be driven. In this case, one or more of the first to fourth vibration generating devices 700-1 to 700-4 of the vibration generating device 700 may each be implemented as a cooling device, and one or more vibration generating devices, which are not implemented as a cooling device, of the first to fourth vibration generating devices 700-1 to 700-4 may be implemented as a harvesting device, thereby reducing power consumption.

Figure 18:
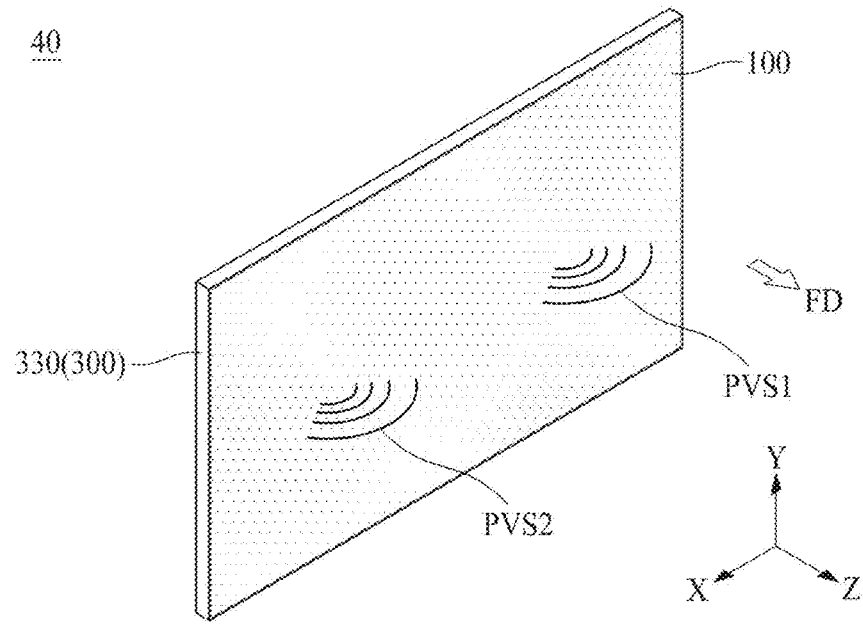
FIG. 18 illustrates a display apparatus according to another embodiment of the present disclosure.
Figure 19:
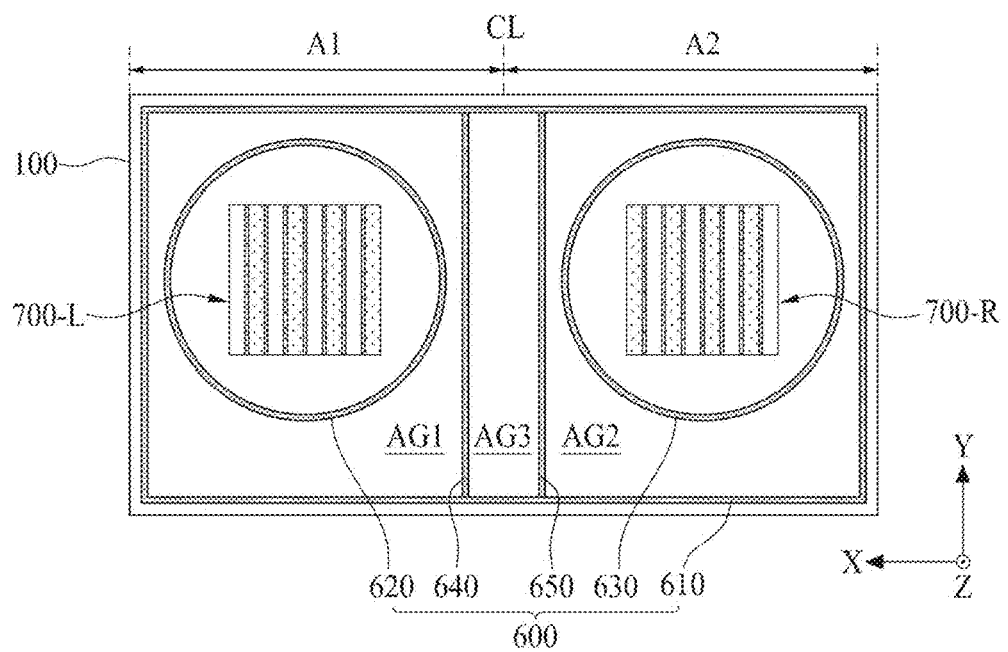
FIG. 19 illustrates a display apparatus including a vibration generating device according to another embodiment of the present disclosure.

FIG. 18 illustrates a display apparatus according to another embodiment of the present disclosure. FIG. 19 illustrates a display apparatus including a vibration generating device according to another embodiment of the present disclosure.

With reference to FIGS. 18 and 19, a vibration generating device 700 of a display apparatus 40 according to another embodiment of the present disclosure may include a first vibration generating device 700-L and a second vibration generating device 700-R, which are disposed on a rear surface of a display panel 100. The vibration generating device 700 according to another embodiment of the present disclosure may include a first portion, a second portion, and a third portion and may be configured as one of the vibration generating devices of FIGS. 4, 7, and 8. In FIGS. 18 and 19, for example, the vibration generating device of FIG. 4 will be described.

The rear surface (or a back surface) of the display panel 100 may include a first region A1 and a second region A2. For example, the rear surface (or the back surface) of the display panel 100 may be divided into the first and second regions A1 and A2. For example, the first region A1 may be a left region of the rear surface of the display panel 100, and the second region A2 may be a right region of the rear surface of the display panel 100. The first and second regions A1 and A2 may be laterally symmetrical with respect to a center line CL of the display panel 100 in a first direction X.

The first vibration generating device 700-L may be disposed in the first region A1 of the display panel 100. The first vibration generating device 700-L may vibrate the first region A1 of the display panel 100 to generate a first vibration sound PVS1 or a first haptic feedback in the first region A1 of the display panel 100. For example, the first vibration sound PVS1 may be a left sound.

The first vibration generating device 700-L may be disposed close to a center portion or a periphery of the display panel 100 in the first region A1 of the display panel 100 with respect to the first direction X. For example, the first vibration generating device 700-L may be disposed close to a first partition 610 or a second partition 620. A size of the first vibration generating device 700-L may have a size equal to or greater than half of the first region A1, but embodiments are not limited thereto and may be adjusted based on a sound characteristic needed for the display apparatus.

The second vibration generating device 700-R may be disposed in the second region A2 of the display panel 100. The second vibration generating device 700-R may vibrate the second region A2 of the display panel 100 to generate a second vibration sound PVS2 or a second haptic feedback in the second region A2 of the display panel 100. For example, the second vibration sound PVS2 may be a right sound.

The second vibration generating device 700-R may be disposed close to a center portion or a periphery of the display panel 100 in the second region A2 of the display panel 100 with respect to the first direction X. For example, the second vibration generating device 700-R may be disposed close to the first partition 610 or the third partition 630. A size of the second vibration generating device 700-R may have a size equal to or greater than half of the second region A2, but embodiments are not limited thereto and may be adjusted based on a sound characteristic needed for the display apparatus 40.

The first vibration generating device 700-L and the second vibration generating device 700-R according to an embodiment of the present disclosure may be substantially the same as the vibration generating devices illustrated in FIGS. 4, 7, and 8, and thus, their repetitive descriptions are omitted. For example, each of the first vibration generating device 700-L and the second vibration generating device 700-R may be configured as one of the vibration generating devices illustrated in FIGS. 4, 7, and 8.

The display apparatus 40 according to an embodiment of the present disclosure may further include a partition 600 for dividing the first and second regions A1 and A2 of the display panel 100. The partition 600 may be an air gap or a space where a sound is generated when the display panel 100 is vibrated by the first vibration generating device 700-L and the second vibration generating device 700-R. An air gap or a space which generates or transfers a sound may be referred to as a partition. The partition 600 may separate a sound or a channel and may prevent or reduce generating of a sound which is not clear and is caused by sound interference. The partition 600 may be referred to as an enclosure or a baffle, but the term is not limited thereto.

The partition 600 according to an embodiment of the present disclosure may further include a fourth partition 640 and a fifth partition 650 disposed between the first vibration generating device 700-L and the second vibration generating device 700-R.

The fourth partition 640 and the fifth partition 650 may be disposed between a supporting member 300 and a portion of the display panel 100 corresponding to a center region of the display panel 100. For example, the fourth partition 640 and the fifth partition 650 may be disposed in parallel between the supporting member 300 and the portion of the display panel 100 corresponding to the center region of the display panel 100. The fourth partition 640 and the fifth partition 650 may separate the first vibration sound PVS1 and the second vibration sound PVS2 respectively generated by the first vibration generating device 700-L and the second vibration generating device 700-R. For example, the fourth partition 640 and the fifth partition 650 may block the transfer of a vibration, generated by the first vibration generating device 700-L in the first region A1 of the display panel 100, to the second region A2 of the display panel 100, or may block the transfer of a vibration, generated by the second vibration generating device 700-R in the second region A2 of the display panel 100, to the first region A1 of the display panel 100. Therefore, the fourth partition 640 and the fifth partition 650 may attenuate or absorb a vibration of the display panel 100 at a center of the display panel 100, and thus, may block the transfer of a sound of the first region A1 to the second region A2 or may block the transfer of a sound of the second region A2 to the first region A1. Accordingly, the fourth partition 640 and the fifth partition 650 may separate a left sound and a right sound to more enhance a sound output characteristic of the display apparatus 40, and thus, the display apparatus 40 according to the present disclosure may separate the left and right sounds by using the fourth partition 640 and the fifth partition 650 to output a two-channel stereo sound to a forward region in front of the display panel 100.

For example, the partition 600 may include polyurethane, polyolefin, and/or the like, but embodiments are not limited thereto. As another example, the partition 600 may include a single-sided tape, a double-sided tape, a single-sided foam pad, a double-sided foam pad, a single-sided foam tape, and/or a double-sided foam tape, and for example, may include a material having an elastic force which enables compression to be made to a certain degree.

As another example, one of the fourth partition 640 and the fifth partition 650 may be omitted. For example, when the fifth partition 650 of the fourth partition 640 and the fifth partition 650 is omitted, the fourth partition 640 may be disposed between the supporting member 300 and the display panel 100 to correspond to a rear center line CL of the display panel 100. Even when one of the fourth partition 640 and the fifth partition 650 is disposed between the first vibration generating device 700-L and the second vibration generating device 700-R, a left sound and a right sound may be separated from each other.

Therefore, the fourth partition 640 and the fifth partition 650 may separate a left sound and a right sound to more enhance a sound output characteristic of the display apparatus 40. Also, the display apparatus 40 including the fourth partition 640 or the fifth partition 650 may separate the left and right sounds by using the fourth partition 640 or the fifth partition 650 to output a two-channel stereo sound to the forward region in front of the display panel 100.

The partition 600 according to an embodiment of the present disclosure may further include a first partition 610 disposed between the display panel 100 and the supporting member 300.

The first partition 610 may be disposed to surround all of the first vibration generating device 700-L and the second vibration generating device 700-R. For example, the first partition 610 may be disposed along a region between a rear periphery of the display panel 100 and a front periphery of the supporting member 300. The first partition 610 may be referred to as an edge partition, a periphery partition, a sound blocking member, an edge enclosure, a periphery partition, or a baffle, but the terms are not limited thereto. For example, the first partition 610 may be disposed adjacent to or in contact with the connection member 400 illustrated in FIG. 2 and may be surrounded by the connection member 400. As another example, the first partition 610 may be provided as one body with the connection member 400.

The first partition 610 may provide first to third air gaps AG1 to AG3 between the display panel 100 and the supporting member 300 along with the fourth partition 640 or the fifth partition 650. For example, each of the first to third air gaps AG1 to AG3 may be referred to as a vibration space, a sound pressure space, a sound box, a sound portion, a resonance box, or a resonance portion, but the term is not limited thereto.

The first air gap AG1 may be provided in the first region A1 of the display panel 100 surrounded by the fourth partition 640 and the first partition 610 disposed in the first region A1 of the display panel 100.

The second air gap AG2 may be provided in the second region A2 of the display panel 100 surrounded by the fifth partition 650 and the first partition 610 disposed in the second region A2 of the display panel 100.

The third air gap AG3 may be provided in a center region of the display panel 100 surrounded by the fourth and fifth partitions 640 and 650 and the first partition 610. For example, the third air gap AG3 may be provided between the second air gap AG2 and the first air gap AG1 including the rear center line CL of the display panel 100. The third air gap AG3 may be referred to as a sound separation space, a sound blocking space, or a sound interference prevention space, but the term is not limited thereto. The third air gap AG3 may spatially separate the first air gap AG1 from the second air gap AG2, and thus, may prevent a resonance phenomenon or an interference phenomenon which occurs in each of the first air gap AG1 and the second air gap AG2 and corresponds a certain frequency band.

The first vibration generating device 700-L may be surrounded by the first partition 610 and the second partition 620 which provide the first air gap AG1, and the second vibration generating device 700-R may be surrounded by the first partition 610 and the third partition 630 which provide the second air gap AG2.

When one of the first partition 610 and the fourth partition 640 is omitted, the third air gap AG3 may be omitted.

Therefore, the first partition 610 may surround a side surface between the display panel 100 and the supporting member 300 and may individually surround each of the first vibration generating device 700-L and the second vibration generating device 700-R along with the second partition 620 and the third partition 630 to secure a vibration space of each of the first vibration generating device 700-L and the second vibration generating device 700-R, and thus, may enhance a sound pressure characteristic of left and right sounds and may prevent a sound or a sound pressure from being leaked to the outside through the side surface between the display panel 100 and the supporting member 300, thereby more enhancing a sound output characteristic of the display apparatus 40.

The partition 600 according to an embodiment of the present disclosure may further include a second partition 620 surrounding the first vibration generating device 700-L and a third partition 630 surrounding the second vibration generating device 700-R.

The second partition 620 may be disposed between the display panel 100 and the supporting member 300 to correspond to the first air gap AG1 and may surround the first vibration generating device 700-L. The second partition 620 according to an embodiment of the present disclosure may have a circular shape surrounding the first vibration generating device 700-L, but embodiments are not limited thereto and may have a shape which is the same as or different from a whole shape of the first vibration generating device 700-L. For example, when the first vibration generating device 700-L has a rectangular (e.g., tetragonal or square) shape, the second partition 620 may have a rectangular (e.g., tetragonal or square) shape having a size which is relatively greater than that of the first vibration generating device 700-L.

The second partition 620 may limit (or define) a vibration region (or a vibration area) of the display panel 100 based on the first vibration generating device 700-L. For example, in the first region A1 of the display panel 100, as a size of the second partition 620 increases, a vibration region of the first region A1 may increase, and thus, a low-pitched sound band characteristic of a left sound may be enhanced. On the other hand, in the first region A1 of the display panel 100, as a size of the second partition 620 decreases, the vibration region of the first region A1 may decrease, and thus, a high-pitched sound band characteristic of the left sound may be enhanced. Accordingly, a size of the second partition 620 may be adjusted based on a desired characteristic of a sound band, based on a vibration of the display panel 100.

The third partition 630 may be disposed between the display panel 100 and the supporting member 300 to correspond to the second air gap AG2 and may surround the second vibration generating device 700-R. In order for a left sound to be symmetrical with a right sound, the third partition 630 may have the same shape as that of the second partition 620 and a symmetrical structure with the second partition 620 with respect to the rear center line CL of the display panel 100, and thus, description relevant thereto is omitted.

The third partition 630 may limit (or define) a vibration region (or a vibration area) of the display panel 100 based on the second vibration generating device 700-R. For example, in the second region A2 of the display panel 100, as a size of the third partition 630 increases, a vibration region of the second region A2 may increase, and thus, the low-pitched sound band characteristic of the left sound may be enhanced. On the other hand, in the second region A2 of the display panel 100, as a size of the third partition 630 decreases, the vibration region of the second region A2 may decrease, and thus, the high-pitched sound band characteristic of the left sound may be enhanced. Accordingly, a size of the third partition 630 may be adjusted based on a desired characteristic of a sound band, based on a vibration of the display panel 100.

The second partition 620 and the third partition 630 may limit a vibration region (or a vibration area) of each of the first vibration generating device 700-L and the second vibration generating device 700-R, and thus, may enhance lateral symmetricity of a left sound and a right sound each generated based on a vibration of the display panel 100 and may optimize a sound pressure characteristic and a reproduction sound band of each of the left and right sounds. As another example, when the second partition 620 and the third partition 630 are provided, the first partition 610 may be omitted. As another example, when the second partition 620 and the third partition 630 are provided, one of the first partition 610, the fourth partition 640, and the fifth partition 650 may be omitted.

Therefore, since the display apparatus according to an embodiment of the present disclosure includes the partition 600, the sound pressure characteristic and reproduction sound band of each of the left and right sounds may be optimized. For example, the display apparatus according to an embodiment of the present disclosure may include at least one of the fourth and fifth partitions 640 and 650. As another example, the display apparatus according to an embodiment of the present disclosure may include the first partition 610 and at least one of the fourth and fifth partitions 640 and 650. As another example, the display apparatus according to an embodiment of the present disclosure may include the first to third partitions 610 to 630. As another example, the display apparatus according to an embodiment of the present disclosure may include the first to fifth partitions 610 to 650.

Therefore, the display apparatus according to another embodiment of the present disclosure may output, through the first vibration generating device 700-L and the second vibration generating device 700-R, a left sound and a right sound to a forward region FD in front of the display panel 100 to provide a stereo sound to a user. Also, the display apparatus according to another embodiment of the present disclosure may separate the left and right sounds by using the partition 600 to output a two-channel stereo sound to the forward region FD in front of the display panel 100.

Figure 20A:
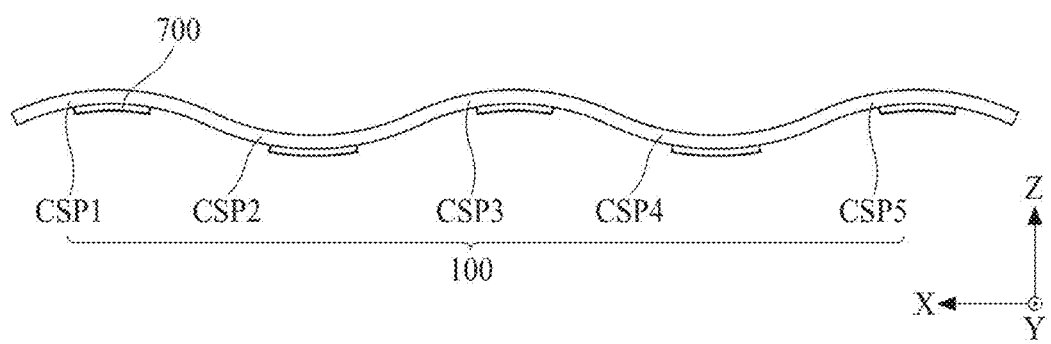
FIGS. 20A to 20C illustrate a display apparatus according to another embodiment of the present disclosure.
Figure 20B:
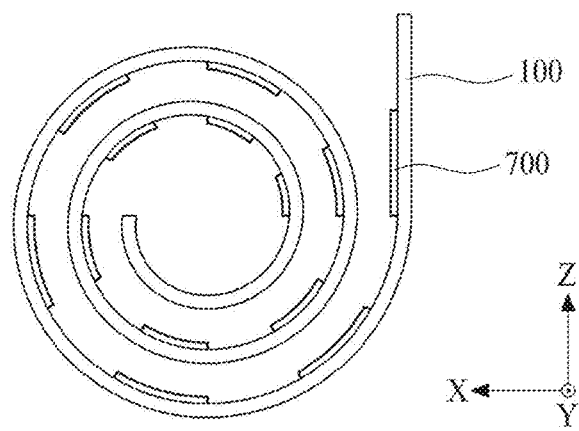
Figure 20C:
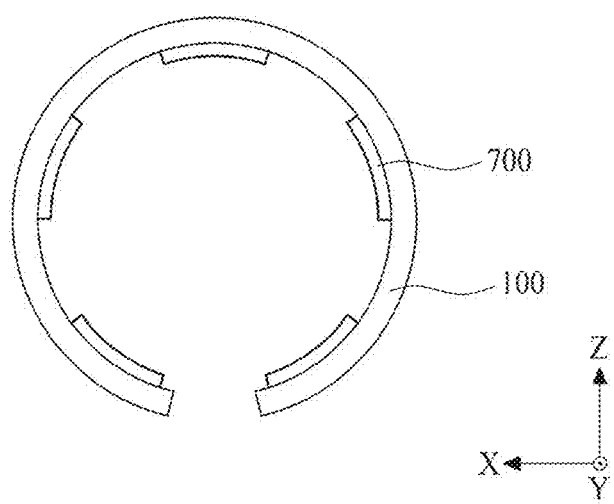

FIGS. 20A to 20C illustrate a display apparatus according to another embodiment of the present disclosure.

With reference to FIGS. 20A to 20C, a vibration generating device according to another embodiment of the present disclosure may include a first portion, a second portion, and a third portion and may be configured as one of the vibration generating devices of FIGS. 4, 7, and 8. In the following description, for example, the vibration generating device of FIG. 4 will be described.

With reference to FIG. 20A, a vibration generating device 700 according to embodiments of the present disclosure may be applied to a commercial display apparatus or a flexible display apparatus including a display panel 100 including a plurality of curved surface portions CSP1 to CSP5 which are concave or convex. For example, the vibration generating device 700 may be implemented to be bent in a shape having a curvature value (or a curvature radius) matching a convex portion or a concave portion of each of the curved surface portions CSP1 to CSP5 of the display panel 100 and may be disposed in the convex portion or the concave portion of each of the curved surface portions CSP1 to CSP5 of the display panel 100. As another example, the vibration generating device 700 may be implemented to have a shape corresponding to the curvature value (or the curvature radius) of each of the curved surface portions CSP1 to CSP5 of the display panel 100 and may be disposed on a whole rear surface of the display panel 100.

With reference to FIG. 20B, a vibration generating device 700 according to embodiments of the present disclosure may be applied to a rollable display apparatus including a display panel 100 which is wound in a spiral shape or unwound. For example, the vibration generating device 700 according to embodiments of the present disclosure may be implemented to have a shape having a curvature value (or a curvature radius) of the display panel 100 which is wound in a spiral shape or unwound, and a plurality of vibration generating devices 700 may be arranged at certain intervals on a rear surface of the display panel 100. As another example, the vibration generating device 700 may be implemented to have a shape corresponding to the curvature value (or the curvature radius) of the display panel 100 and may be disposed on the whole rear surface of the display panel 100.

With reference to FIG. 20C, a vibration generating device 700 according to embodiments of the present disclosure may be applied to a wearable display apparatus including a display panel 100 which is wound around a wrist of a user and is bent in a C-shape. For example, the vibration generating device 700 according to embodiments of the present disclosure may be implemented to have a shape having a curvature value (or a curvature radius) of the display panel 100 which is bent in the C-shape, and a plurality of vibration generating devices 700 may be arranged at certain intervals on a rear surface of the display panel 100. As another example, the vibration generating device 700 may be implemented to have a shape corresponding to the curvature value (or the curvature radius) of the display panel 100 which is bent in the C-shape and may be disposed on the whole rear surface of the display panel 100.

The vibration generating device according to an embodiment of the present disclosure may be applied as a vibration generating device provided in a display apparatus. The display apparatus according to an embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, TVs, wall paper display apparatuses, signage devices, game machines, notebook computers, monitors, cameras, camcorders, home appliances, etc. Also, the vibration generating device according to an embodiment of the present disclosure may be applied to organic light emitting lighting devices or inorganic light emitting lighting devices. When the vibration generating device or a sound generating device is applied to a lighting device, the vibration generating device or the sound generating device may act as lighting and a speaker.

A display apparatus according to an embodiment of the present disclosure will be described below.

A display apparatus according to an embodiment of the present disclosure includes a display panel configured to display an image and a vibration generating device configured to vibrate the display panel, wherein the vibration generating device includes a plurality of first portions having a piezoelectric characteristic, and a plurality of second portions disposed between the plurality of first portions to have flexibility.

According to some embodiments of the present disclosure, the vibration generating device may include a third portion disposed near the plurality of second portions.

According to some embodiments of the present disclosure, AC driving may be performed for the first portion and the second portion and DC driving may be performed for the third portion.

According to some embodiments of the present disclosure, the third portion may be disposed between the plurality of second portions.

According to some embodiments of the present disclosure, the third portion may surround the plurality of first portions and the plurality of second portions.

According to some embodiments of the present disclosure, the display apparatus may further include a first electrode d on a lower surface of the vibration generating device and a second electrode on an upper surface of the vibration generating device.

According to some embodiments of the present disclosure, the vibration generating device may further comprise a first protection layer on the first electrode and a second protection layer on the second electrode.

According to some embodiments of the present disclosure, the display apparatus may further include a heat dissipation plate on a rear surface of the display panel, the second electrode may be disposed on a rear surface of the heat dissipation plate.

According to some embodiments of the present disclosure, the first electrode may be a signal electrode, and the second electrode may be a ground electrode.

According to some embodiments of the present disclosure, the third portion may be a P-N junction device.

According to some embodiments of the present disclosure, the display apparatus may further include a first electrode on an upper surface of an N-type device outside the third portion, a second electrode on an upper surface of a P-type device outside the third portion, and a third electrode on a lower surface of the N-type device and the P-type device.

According to some embodiments of the present disclosure, the display apparatus may further include a heat dissipation plate on a rear surface of the display panel, the third electrode may be disposed on a rear surface of the heat dissipation plate.

According to some embodiments of the present disclosure, each of the first portion and the second portion may be a vibration portion, and the third portion may be a heat dissipation portion.

According to some embodiments of the present disclosure, the vibration generating device may be a sound generating device configured to vibrate the display panel to generate a sound.

According to some embodiments of the present disclosure, the vibration generating device may be a haptic device configured to vibrate the display panel to output a feedback based on an action of a user.

According to some embodiments of the present disclosure, the display apparatus may further include a supporting member on a rear surface of the display panel, and a connection member between the display panel and the supporting member.

According to some embodiments of the present disclosure, the supporting member may comprise a rear surface portion that covers the rear surface of the display panel with the gap space therebetween and a side surface portion that is connected to a periphery of the rear surface portion and covers a side surface of the display panel.

According to some embodiments of the present disclosure, the vibration generating device may be attached on a rear surface of the display panel by an adhesive member that comprises a hollow portion between the display panel and the vibration generating device.

According to some embodiments of the present disclosure, the first portion may be formed of an inorganic material portion including an electroactive material and the second portion may be formed of an organic material portion.

According to some embodiments of the present disclosure, the vibration generating device may be implemented with one film.

According to some embodiments of the present disclosure, the display apparatus may further include a first partition between the display panel and the supporting member and a second partition surrounding the vibration generating device.

According to some embodiments of the present disclosure, the vibration generating device may comprise a first vibration generating device and a second vibration generating device on a rear surface of the display panel.

According to some embodiments of the present disclosure, wherein the display panel may comprise a plurality of curved surface portions that are concave or convex, and the vibration generating device may be disposed in the convex portions or the concave portions of each of the plurality of curved surface portions of the display panel.

According to some embodiments of the present disclosure, the display panel may be bent and the vibration generating device may comprise a plurality of vibration generating devices arranged at certain intervals on a rear surface of the display panel.

A display apparatus according to an embodiment of the present disclosure includes a display panel configured to display an image and a vibration generating device configured to vibrate the display panel, wherein the vibration generating device includes a piezoelectric composite layer including a plurality of first portions and a plurality of second portions.

According to some embodiments of the present disclosure, the display apparatus may further include a member disposed near the piezoelectric composite layer, According to some embodiments of the present disclosure, AC driving may be performed for the piezoelectric composite layer and DC driving may be performed for the member.

According to some embodiments of the present disclosure, the member may be disposed between adjacent portions of the piezoelectric composite layer to have a heat dissipation characteristic.

According to some embodiments of the present disclosure, the member may be disposed outside the piezoelectric composite layer to have a heat dissipation characteristic.

According to some embodiments of the present disclosure, the plurality of second portions may be disposed between the plurality of first portions.

According to some embodiments of the present disclosure, the display apparatus may further include a signal electrode on a lower surface of the vibration generating device and a ground electrode on an upper surface of the vibration generating device.

According to some embodiments of the present disclosure, the vibration generating device may further comprise a first protection layer on the signal electrode and a second protection layer on the ground electrode.

According to some embodiments of the present disclosure, the display apparatus may further include a heat dissipation plate on a rear surface of the display panel, the ground electrode may be disposed to contact the heat dissipation plate.

According to some embodiments of the present disclosure, the member may be a P-N junction device.

According to some embodiments of the present disclosure, the display apparatus may further includes a signal electrode on an upper surface of an N-type device outside the member, a ground electrode on an upper surface of a P-type device outside the member, and a connection electrode on a lower surface of each of the N-type device and the P-type device to connect the P-N junction device.

According to some embodiments of the present disclosure, the display apparatus may further include a heat dissipation plate on a rear surface of the display panel, the connection electrode may be disposed on a rear surface of the heat dissipation plate.

According to some embodiments of the present disclosure, the vibration generating device is implemented with one or more of a sound generating device configured to vibrate the display panel to generate a sound and a haptic device configured to vibrate the display panel to output a feedback based on an action of a user.

According to some embodiments of the present disclosure, the display apparatus may further include a supporting member on a rear surface of the display panel and a partition between the display panel and the supporting member.

According to some embodiments of the present disclosure, the display apparatus may further include a partition surrounding the vibration generating device.

According to some embodiments of the present disclosure, the display apparatus may further include a supporting member on a rear surface of the display panel, a first partition between the display panel and the supporting member, and a second partition surrounding the vibration generating device.

According to some embodiments of the present disclosure, the vibration generating device may be attached on a rear surface of the display panel by an adhesive member that comprises a hollow portion between the display panel and the vibration generating device.

According to some embodiments of the present disclosure, the plurality of first portions may be formed of an inorganic material portion including an electroactive material and the plurality of second portions may be formed of an organic material portion.

According to some embodiments of the present disclosure, the vibration generating device may be implemented with one film.

According to some embodiments of the present disclosure, the vibration generating device may comprise a first vibration generating device and a second vibration generating device on a rear surface of the display panel.

According to some embodiments of the present disclosure, the display panel may comprise a plurality of curved surface portions that are concave or convex, and the vibration generating device may be disposed in the convex portions or the concave portions of each of the plurality of curved surface portions of the display panel.

According to some embodiments of the present disclosure, the display panel may be bent and the vibration generating device may comprise a plurality of vibration generating devices arranged at certain intervals on a rear surface of the display panel.

A method of manufacturing a vibration generating device comprises manufacturing an inorganic material mother substrate having a piezoelectric characteristic by a pre-process, forming a groove or a trench between adjacent portions of the inorganic material mother substrate using a process of dicing or sawing the inorganic material mother substrate, filling a material of a third portion into the groove or the trench between the adjacent portions of the inorganic material mother substrate, forming a groove or trench in each of both sides of the material of the third portion, filling a material of a second portion into the groove or trench, and forming the first portion, the second portion, and the third portion of the vibration generating device by a lapping process or a cutting process.

A method of manufacturing a vibration generating device comprises manufacturing an inorganic material mother substrate having a piezoelectric characteristic by a pre-process, forming a region filled with a material of a third portion between adjacent portions of the inorganic material mother substrate by using a process of dicing or sawing the inorganic material mother substrate, filling a material of the third portion into the region formed in the inorganic material mother substrate, forming a groove or trench between the material of the third portion and the inorganic material mother substrate by using an etching process, filling a material of a second portion into the groove or trench, and forming the first portion, the second portion, and the third portion of the vibration generating device by a lapping process or a cutting process.

The display apparatus according to the embodiments of the present disclosure may include a vibration generating device which vibrates a display panel, and thus, may be implemented with a sound generating device, which generates a sound so that a traveling direction of a sound of the display apparatus is a direction toward a front surface of the display panel, and/or a haptic device which outputs a feedback based on an action of a user.

The display apparatus according to the embodiments of the present disclosure may include a vibration generating device which includes a heat dissipation unit, thereby providing a display apparatus having excellent vibration characteristic and heat dissipation performance.

In the display apparatus according to the embodiments of the present disclosure, a vibration generating device may be implemented with one film, without the damage of elements configuring the vibration generating device.

It will be apparent to those skilled in the art that various modifications and variations maybe made in the display apparatus of the present disclosure without departing from the technical idea or scope of the disclosure. Thus, it may be intended that embodiments of the present disclosure cover the modifications and variations of this disclosure provided they come within the scope of the appended claims and their equivalents.

What is claimed is:

1. A display apparatus, comprising:
   a display panel configured to display an image; and
   a vibration generating device configure to vibrate the display panel,
   wherein the vibration generating device comprises:
   a plurality of first portions having an inorganic material;
   a plurality of second portions disposed between the plurality of first portions and having an organic material; and
   a third portion disposed near the plurality of second portions and having a heat dissipation characteristic.

2. The display apparatus of claim 1, wherein the plurality of first portions having a piezoelectric characteristic, and
   wherein the plurality of second portions disposed between the plurality of first portions to have flexibility.

3. The display apparatus of claim 1, wherein AC driving is performed for the first portion and the second portion and DC driving is performed for the third portion.

4. The display apparatus of claim 1, wherein the third portion is disposed between the plurality of second portions.

5. The display apparatus of claim 1, wherein the third portion surrounds the plurality of first portions and the plurality of second portions.

6. The display apparatus of claim 1, further comprising:
a first electrode on a lower surface of the vibration generating device; and
a second electrode on an upper surface of the vibration generating device.

7. The display apparatus of claim 6, wherein the vibration generating device further comprises a first protection layer on the first electrode and a second protection layer on the second electrode.

8. The display apparatus of claim 6, further comprising a heat dissipation plate on a rear surface of the display panel,
wherein the second electrode is on a rear surface of the heat dissipation plate.

9. The display apparatus of claim 6, wherein the first electrode is a signal electrode, and the second electrode is a ground electrode.

10. The display apparatus of claim 1, wherein the third portion is a P-N junction device.

11. The display apparatus of claim 10, further comprising:
a first electrode on a lower surface of an N-type device outside the third portion;
a second electrode on an upper surface of a P-type device outside the third portion; and
a third electrode on a lower surface of the N-type device and the P-type device.

12. The display apparatus of claim 11, further comprising a heat dissipation plate on a rear surface of the display panel,
wherein the third electrode is disposed on a rear surface of the heat dissipation plate.

13. The display apparatus of claim 1, wherein each of the first portion and the second portion is a vibration portion, and the third portion is a heat dissipation portion.

14. The display apparatus of claim 1, wherein the vibration generating device is a sound generating device configured to vibrate the display panel to generate a sound.

15. The display apparatus of claim 1, wherein the vibration generating device is a haptic device configured to vibrate the display panel to output a feedback based on an action of a user.

16. The display apparatus of claim 1, further comprising:
a supporting member on a rear surface of the display panel; and
a connection member between the display panel and the supporting member.

17. The display apparatus of claim 16, wherein the supporting member comprises a rear surface portion that covers the rear surface of the display panel with a gap space therebetween and a side surface portion that is connected to a periphery of the rear surface portion and covers a side surface of the display panel.

18. The display apparatus of claim 16, further comprising:
a first partition between the display panel and the supporting member and a second partition surrounding the vibration generating device.

19. The display apparatus of claim 1, wherein the vibration generating device is attached on a rear surface of the display panel by an adhesive member that comprises a hollow portion between the display panel and the vibration generating device.

20. The display apparatus of claim 1, wherein the inorganic material includes an electroactive material.

21. The display apparatus of claim 1, wherein the vibration generating device is implemented with one film.

22. The display apparatus of claim 1, wherein the vibration generating device comprises a first vibration generating device and a second vibration generating device on a rear surface of the display panel.

23. The display apparatus of claim 1, wherein the display panel comprises a plurality of curved surface portions that are concave or convex, and the vibration generating device is disposed in the convex portions or the concave portions of each of the plurality of curved surface portions of the display panel.

24. The display apparatus of claim 1, wherein the display panel is bent and the vibration generating device comprises a plurality of vibration generating devices arranged at certain intervals on a rear surface of the display panel.

25. A display apparatus, comprising:
a display panel configured to display an image; and
a vibration generating device configured to vibrate the display panel,
wherein the vibration generating device comprises:
a piezoelectric composite layer including a plurality of first portions and a plurality of second portions; and
a member disposed near the piezoelectric composite layer,
wherein the plurality of first portions are formed of an inorganic material portion including an electroactive material and the plurality of second portions are formed of an organic material portion, and
wherein AC driving is for being performed for the piezoelectric composite layer, and DC driving is for being performed for the member.

26. The display apparatus of claim 25, wherein the member is disposed between adjacent portions of the piezoelectric composite layer to have a heat dissipation characteristic.

27. The display apparatus of claim 25, wherein the member is disposed outside the piezoelectric composite layer to have a heat dissipation characteristic.

28. The display apparatus of claim 25, wherein the plurality of second portions are disposed between the plurality of first portions.

29. The display apparatus of claim 25, further comprising:
a signal electrode on a lower surface of the vibration generating device; and
a ground electrode on an upper surface of the vibration generating device.

30. The display apparatus of claim 29, wherein the vibration generating device further comprises a first protection layer on the signal electrode and a second protection layer on the ground electrode.

31. The display apparatus of claim 29, further comprising a heat dissipation plate on a rear surface of the display panel,
wherein the ground electrode is disposed to contact the heat dissipation plate.

32. The display apparatus of claim 25, wherein the member is a P-N junction device.

33. The display apparatus of claim 32, further comprising:
a signal electrode on an upper surface of an N-type device outside the member;
a ground electrode on an upper surface of a P-type device outside the member; and
a connection electrode on a lower surface of each of the N-type device and the P-type device to connect the P-N junction device.

34. The display apparatus of claim 33, further comprising a heat dissipation plate on a rear surface of the display panel, wherein the connection electrode is disposed on a rear surface of the heat dissipation plate.

35. The display apparatus of claim 25, wherein the vibration generating device is implemented with one or more of a sound generating device configured to vibrate the display panel to generate a sound and a haptic device configured to vibrate the display panel to output a feedback based on an action of a user.

36. The display apparatus of claim 25, further comprising:
- a supporting member on a rear surface of the display panel; and
- a partition between the display panel and the supporting member.

37. The display apparatus of claim 25, further comprising a partition surrounding the vibration generating device.

38. The display apparatus of claim 25, further comprising:
- a supporting member on a rear surface of the display panel;
- a first partition between the display panel and the supporting member; and
- a second partition surrounding the vibration generating device.

39. The display apparatus of claim 25, wherein the vibration generating device is attached on a rear surface of the display panel by an adhesive member that comprises a hollow portion between the display panel and the vibration generating device.

40. The display apparatus of claim 25, wherein the vibration generating device is implemented with one film.

41. The display apparatus of claim 25, wherein the vibration generating device comprises a first vibration generating device and a second vibration generating device on a rear surface of the display panel.

42. The display apparatus of claim 25, wherein the display panel comprises a plurality of curved surface portions that are concave or convex, and the vibration generating device is disposed in the convex portions or the concave portions of each of the plurality of curved surface portions of the display panel.

43. The display apparatus of claim 25, wherein the display panel is bent and the vibration generating device comprises a plurality of vibration generating devices arranged at certain intervals on a rear surface of the display panel.

* * * * *